US012545276B2

(12) United States Patent
Shimomura et al.

(10) Patent No.: US 12,545,276 B2
(45) Date of Patent: Feb. 10, 2026

(54) PARKING ASSIST DEVICE AND PARKING ASSIST METHOD

(71) Applicant: TOYOTA JIDOSHA KABUSHIKI KAISHA, Toyota (JP)

(72) Inventors: Ichiya Shimomura, Nagoya (JP); Keisuke Oyama, Nisshin (JP); Yuki Minase, Toyota (JP); Motonari Obayashi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 18/403,400

(22) Filed: Jan. 3, 2024

(65) Prior Publication Data

US 2024/0253653 A1 Aug. 1, 2024

(30) Foreign Application Priority Data

Jan. 31, 2023 (JP) .................................. 2023-013414

(51) Int. Cl.
*B60Q 1/00* (2006.01)
*B60W 30/06* (2006.01)
*B60W 30/10* (2006.01)
*B60W 30/18* (2012.01)
*B60W 40/08* (2012.01)
(Continued)

(52) U.S. Cl.
CPC ............ *B60W 50/14* (2013.01); *B60W 30/06* (2013.01); *B60W 30/10* (2013.01); *B60W 30/18163* (2013.01); *B60W 40/08* (2013.01); *B60W 50/10* (2013.01); *B60W 2050/146* (2013.01); *B60W 2510/202* (2013.01); *B60W 2540/18* (2013.01);
(Continued)

(58) Field of Classification Search
CPC ...... B60W 50/14; B60W 30/06; B60W 30/10; B60W 30/18163; B60W 40/08; B60W 50/10; B60W 2050/146; B60W 2510/202; B60W 2540/18; B60W 2540/223; B60W 2552/30; B62D 1/286; B62D 15/0285; B60Y 2300/06; B60Y 2400/90
USPC ...................... 340/438, 439, 932.2, 933, 988
See application file for complete search history.

(56) References Cited

U.S. PATENT DOCUMENTS 9,522,661 B2 12/2016 Inoue et al.
9,604,638 B2 3/2017 Kiyokawa et al.
(Continued)

FOREIGN PATENT DOCUMENTS

CN 109895784 A 6/2019
DE 10 2010 030 164 A1 12/2011
(Continued)

*Primary Examiner* — Anh V La
(74) *Attorney, Agent, or Firm* — Sughrue Mion, PLLC

(57) ABSTRACT

A parking assist device includes: a control device configured to control a host vehicle; and an informing device. The control device is configured to execute automatic parking control. The control device is configured to execute warning control in which the informing device is controlled such that the informing device indicates predetermined warning information when the control device detects that a driver of the host vehicle is in an unsafe state during execution of the automatic parking control. The control device is configured to execute warning restriction control in which indication of the warning information by the informing device is restricted when the host vehicle is traveling in a predetermined specific section during the execution of the automatic parking control.

15 Claims, 17 Drawing Sheets

(51) Int. Cl.
*B60W 50/10* (2012.01)
*B60W 50/14* (2020.01)

(52) U.S. Cl.
CPC ... *B60W 2540/223* (2020.02); *B60W 2552/30* (2020.02)

(56) References Cited

U.S. PATENT DOCUMENTS

| | | |
|---|---|---|
| 9,738,276 B2 | 8/2017 | Kiyokawa et al. |
| 9,828,028 B2 | 11/2017 | Ishijima et al. |
| 9,836,658 B2 | 12/2017 | Kiyokawa et al. |
| 9,875,655 B2 | 1/2018 | Kiyokawa et al. |
| 10,031,227 B2 | 7/2018 | Kikoyaka et al. |
| 10,150,486 B2 | 12/2018 | Hoshino et al. |
| 10,239,520 B2 | 3/2019 | Tomozawa et al. |
| 10,377,416 B2 | 8/2019 | Fukukawa et al. |
| 2011/0273310 A1 | 11/2011 | Kadowaki et al. |
| 2015/0321555 A1* | 11/2015 | Fukata ................. B60W 50/12 701/70 |
| 2018/0178724 A1 | 6/2018 | Hatakeyama et al. |
| 2019/0176813 A1 | 6/2019 | Yamada |
| 2019/0185039 A1 | 6/2019 | Park et al. |
| 2020/0057487 A1* | 2/2020 | Sicconi ................... G06F 3/011 |
| 2020/0242936 A1 | 7/2020 | Matsunaga et al. |
| 2020/0298832 A1 | 9/2020 | Maeda et al. |
| 2021/0221359 A1* | 7/2021 | Yamamoto ............. G05D 1/247 |
| 2022/0111857 A1* | 4/2022 | Kulkarni ................ B60W 40/04 |
| 2022/0324438 A1* | 10/2022 | Liu ..................... B60W 50/035 |
| 2022/0363290 A1 | 11/2022 | Li et al. |

FOREIGN PATENT DOCUMENTS

| | | |
|---|---|---|
| GB | 2481885 A | 1/2012 |
| JP | 2012-217000 A | 11/2012 |
| JP | 2016-192772 A | 11/2016 |
| JP | 2018-107754 A | 7/2018 |
| JP | 2018-184029 A | 11/2018 |
| JP | 2020-117128 A | 8/2020 |
| JP | 2022-154961 A | 10/2022 |
| KR | 10-2016-0057859 A | 5/2016 |
| KR | 10-2019-0073847 A | 6/2019 |

* cited by examiner

CLOSED EYES ARE DETECTED — G41

LOOKING ASIDE IS DETECTED — G42

POOR POSTURE IS DETECTED — G43

| DETECTION MODE | DETECTION CONTENT |
|---|---|
| 0 | NOT DETECTED |
| 1 | CLOSED EYES |
| 2 | LOOKING ASIDE |
| 3 | POOR POSTURE |
| 4 | CLOSED EYES AND POOR POSTURE |
| 5 | LOOKING ASIDE AND POOR POSTURE |

PARKING ASSIST DEVICE AND PARKING ASSIST METHOD

CROSS-REFERENCE TO RELATED APPLICATION

This application claims priority to Japanese Patent Application No. 2023-013414 filed on Jan. 31, 2023, incorporated herein by reference in its entirety.

BACKGROUND

1. Technical Field

The present disclosure relates to a parking assist device and a parking assist method.

2. Description of Related Art

A parking assist device is configured to be able to execute automatic parking control for executing at least a part or all of operations to drive a host vehicle such that the host vehicle travels along a path that leads to a predetermined parking spot to be parked at the parking spot. In association with such a parking assist device, the standards ISO 20900 (partially automated parking systems: PAPS) and ISO 16787 (assisted parking systems: APS) prescribe vehicle control related to parking of vehicles.

Japanese Unexamined Patent Application Publication No. 2020-117128 discloses a parking assist device capable of storing the position of a parking spot at which a host vehicle can be parked. With this parking assist device, the host vehicle can be parked at the stored parking spot through automatic parking control.

SUMMARY

During execution of the automatic parking control, a driver of the host vehicle may perform unsafe actions such as taking hands off a steering wheel, looking aside, or closing eyes. Hence, it is necessary to appropriately monitor the state of the driver during execution of the automatic parking control, and indicate warning information to the driver when it is found that the driver is in an unsafe state in which an unsafe action is being performed. On the other hand, the steering wheel of the host vehicle is occasionally rotated significantly during execution of the automatic parking control. If warning information is indicated since the driver is in the unsafe state when the steering wheel is rotated significantly, steering torque that acts on the steering wheel may be increased with the driver strongly grasping the steering wheel, which may suspend the automatic parking control.

The present disclosure provides a parking assist device and a parking assist method. That is, the present disclosure provides a parking assist device and a parking assist method capable of indicating warning information for a driver being in an unsafe state at an appropriate timing during execution of automatic parking control.

A first aspect of the present disclosure provides a parking assist device. The parking assist device includes: a control device configured to control a host vehicle such that the host vehicle is parked at a predetermined parking spot; and an informing device configured to indicate predetermined information. The control device is configured to execute automatic parking control in which the host vehicle is controlled such that the host vehicle travels along a path to be parked at the parking spot. The path leads to the parking spot. The control device is configured to execute warning control in which the informing device is controlled such that the informing device indicates predetermined warning information when the control device detects a driver of the host vehicle is in an unsafe state during execution of the automatic parking control. The unsafe state includes a state in which the driver does not grasp a steering wheel of the host vehicle. The control device is configured to execute warning restriction control in which indication of the warning information by the informing device is restricted when the host vehicle is traveling in a predetermined specific section during the execution of the automatic parking control.

A second aspect of the present disclosure provides a parking assist method of controlling a host vehicle such that the host vehicle is parked at a predetermined parking spot. The parking assist method includes: executing automatic parking control in which the host vehicle is controlled such that the host vehicle travels along a path to be parked at the parking spot: indicating predetermined warning information when a driver of the host vehicle is found to be in an unsafe state during execution of the automatic parking control; and restricting indication of the warning information when the host vehicle is traveling in a predetermined specific section during the execution of the automatic parking control. The unsafe state includes a state in which the driver does not grasp a steering wheel of the host vehicle. The path leads to the parking spot.

With the parking assist device and the parking assist method according to the present disclosure, indication of the warning information is restricted when the host vehicle is traveling in the specific section during execution of the automatic parking control, even when it is found that the driver of the host vehicle is in the unsafe state including a state of not grasping the steering wheel. Therefore, it is possible to suppress indication of the warning information being made for the driver being in the unsafe state at an inappropriate timing, by setting a section in which it is not preferable to indicate the warning information as the specific section. In other words, indication of the warning information can be made for the driver being in the unsafe state at an appropriate timing during execution of the automatic parking control.

"Restricting indication of warning information" in the warning restriction control according to the present disclosure means not indicating a part or all of warning information that should be indicated through the warning control when the host vehicle is traveling in the specific section. Thus, restricting indication of warning information also includes indicating no warning information at all. In addition, restricting indication of warning information also includes not indicating a part of warning information but indicating another part of warning information. In this case, the warning information to be indicated through execution of the warning restriction control can be set in advance as warning information that can be indicated without causing any problem while the host vehicle is traveling in the specific section.

In the parking assist device according to the first aspect of the present disclosure, the path may include a registered path stored in advance. With this configuration, the host vehicle can be parked at the predetermined parking spot by traveling along the registered path stored in advance.

In the parking assist device according to the first aspect of the present disclosure, the specific section may be set as a section including a section in which the steering wheel of the host vehicle is rotated significantly.

In the parking assist device according to the first aspect of the present disclosure, the specific section may be set as a section in which an amount of variation in a rotational angle of the steering wheel of the host vehicle per predetermined unit time is equal to or more than a threshold variation amount.

In the parking assist device according to the first aspect of the present disclosure, the specific section may be set as a section in which a rotational angle of the steering wheel of the host vehicle is equal to or more than a threshold angle.

With such configurations, indication of the warning information is restricted while the host vehicle is traveling in a section in which the steering wheel is rotated significantly. Hence, it is possible to suppress execution of the automatic parking control being hindered by the driver grasping the steering wheel being rotated by being informed of the warning information while the host vehicle is traveling in a section in which the steering wheel is rotated significantly.

In the parking assist device according to the first aspect of the present disclosure, the specific section may be set as a curved section with a radius that is equal to or less than a threshold radius. With this configuration, indication of the warning information is restricted while the host vehicle is traveling on a relatively sharp curved road. Hence, it is possible to suppress execution of the automatic parking control being hindered by indication of the warning information while the host vehicle is traveling on the curved road.

In the parking assist device according to the first aspect of the present disclosure, the control device may be configured to control the informing device so as to indicate information showing that the steering wheel of the host vehicle is automatically rotated when the host vehicle is traveling in the specific section. With this configuration, the driver can expect automatic rotation of the steering wheel by being informed that the steering wheel will be automatically rotated when the host vehicle is traveling in a section in which the steering wheel is rotated significantly, or on a relatively sharp curved road, during execution of the automatic parking control.

In the parking assist device according to the first aspect of the present disclosure, the parking assist device may further include a steering torque sensor configured to detect steering torque that acts on the steering wheel of the host vehicle. The control device may be configured to suspend or cancel the automatic parking control when (i) the host vehicle is traveling in a section other than the specific section during the execution of the automatic parking control and (ii) the steering torque sensor detects steering torque that is more than predetermined first threshold torque. The control device may be configured to continue the automatic parking control when (i) the host vehicle is traveling in the specific section during the execution of the automatic parking control and (ii) the steering torque sensor detects steering torque that is more than the first threshold torque.

With this configuration, when steering torque that is more than the first threshold torque is detected while the vehicle is traveling in a section other than the specific section, the control device determines that the driver of the host vehicle is requesting cancellation of the automatic parking control by consciously executing a steering intervention, and suspends or cancels the automatic parking control. When steering torque that is more than the first threshold torque is detected while the host vehicle is traveling in the specific section, on the other hand, the control device determines that the steering torque has been increased by the driver of the host vehicle unconsciously strongly grasping the steering wheel, and continues the automatic parking control. Consequently, the automatic parking control can be suspended or canceled for a conscious steering intervention by the driver, and the automatic parking control can be continued for an unconscious steering intervention.

In the parking assist device according to the first aspect of the present disclosure, the control device may be configured to control the informing device so as to indicate information showing that a travel path of the host vehicle deviates when (i) the host vehicle is traveling in the specific section during the execution of the automatic parking control and (ii) the steering torque sensor detects steering torque that is more than the first threshold torque.

The automatic parking control is continued also when steering torque that is more than the first threshold torque acts on the steering wheel when the host vehicle is traveling in the specific section. In this case, the travel path of the host vehicle deviates from the path that leads to the parking spot. Thus, the driver can reduce steering torque that acts on the steering wheel by being informed that the travel path of the host vehicle will deviate, which allows the travel path of the host vehicle to be recovered to the path that leads to the parking spot.

In the parking assist device according to the first aspect of the present disclosure, the control device may be configured to suspend or cancel the automatic parking control when (i) the host vehicle is traveling in the specific section during the execution of the automatic parking control and (ii) the steering torque sensor detects steering torque that is equal to or more than second threshold torque. The second threshold torque may be set in advance as steering torque with a magnitude that causes the travel path of the host vehicle to deviate to a degree that does not allow recovery to the path that leads to the parking spot.

With this configuration, the automatic parking control can be suspended or canceled quickly when large steering torque that causes the travel path of the host vehicle to deviate to a degree that does not allow recovery to the path that leads to the parking spot acts on the steering wheel when the host vehicle is traveling in the specific section.

In the parking assist device according to the first aspect of the present disclosure, the control device may store one of paths to the parking spot as a registered path in advance. The automatic parking control may include an automated travel process in which the host vehicle is controlled such that the host vehicle travels in a vicinity of the registered path in parallel with the registered path, a merging process in which the host vehicle is controlled such that a travel path of the host vehicle is merged with the registered path, and a path travel process in which the host vehicle is caused to travel along the registered path after execution of the merging process. The specific section may include a merging section in which the host vehicle travels during the execution of the merging process.

In the parking assist device according to the first aspect of the present disclosure, the control device may store one of paths to the parking spot as a registered path in advance. The control device may be configured to execute an automated travel process, a merging process, and a path travel process as the automatic parking control. The automated travel process may be a process in which the host vehicle is controlled such that the host vehicle travels in a vicinity of the registered path in parallel with the registered path. The merging process may be a process in which the host vehicle is controlled such that a travel path of the host vehicle is merged with the registered path. The path travel process may be a process in which the host vehicle is caused to travel along the registered path after execution of the merging process. The specific section may include a merging section in which the host vehicle travels during the execution of the merging process.

The steering wheel may be rotated significantly when the host vehicle enters the registered path from the present travel path. Thus, it is possible to suppress execution of the automatic parking control being hindered by restricting indication of the warning information when the host vehicle is traveling in the merging section that is a section in which the host vehicle travels during execution of the merging process.

In the parking assist device according to the first aspect of the present disclosure, the specific section may include a section in which operation to vary a posture of the host vehicle in order to park the host vehicle at the parking spot is executed.

The steering wheel of the host vehicle may be rotated significantly when operation to vary the posture of the host vehicle in order to park the host vehicle at the parking spot is executed. Thus, it is possible to suppress execution of the automatic parking control being hindered by restricting indication of the warning information in such a case.

In the parking assist device according to the first aspect of the present disclosure, the informing device may be a display device that displays a predetermined image. The control device may be configured to control the display device so as to display an image in which the specific section is emphasized while the host vehicle is traveling in the specific section.

With this configuration, the driver of the host vehicle can recognize that the vehicle is traveling in the specific section when the display device displays the specific section in an emphasized manner. In this case, the informing device may be the display device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
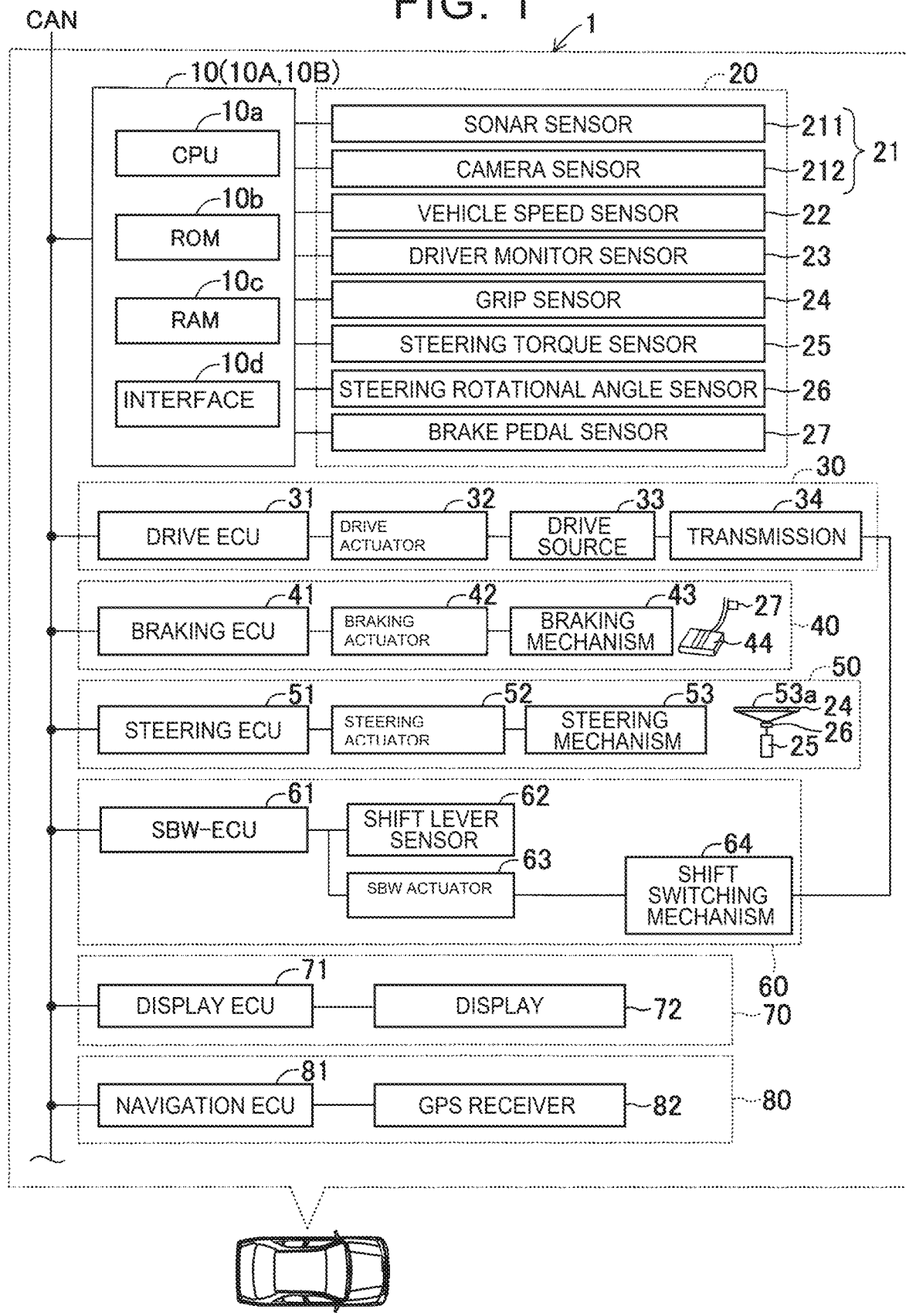
FIG. 1 is a block diagram of a parking assist device according to a first embodiment of the present disclosure.

A parking assist device according to a first embodiment of the present disclosure is mounted on a vehicle 1000 capable of automated driving. Hereinafter, the vehicle 1000 will occasionally be referred to as a "host vehicle". As illustrated in FIG. 1, a parking assist device 1 according to the present embodiment includes a parking assist electronic control unit (ECU) 10, a sensor group 20, a drive device 30, a braking device 40, a steering device 50, a shift switching device 60, a display device 70, and a navigation device 80.

The parking assist ECU 10 includes, as its main component, a microcomputer that includes a central processing unit (CPU) 10a, a read only memory (ROM) 10b, a random access memory (RAM) 10c, and an interface 10d. The parking assist ECU 10 is a control device configured such that various types of control including automatic parking control can be executed by the CPU 10a executing instructions, programs, or routines stored in the ROM 10b. In the present embodiment, the automatic parking control is control in which the host vehicle is parked at a parking spot by the parking assist device 1 controlling at least one of the drive device 30, the braking device 40, and the steering device 50 of the host vehicle. Thus, the automatic parking control may be control in which the parking assist device 1 controls all of the drive device 30, the braking device 40, and the steering device 50, or control in which the parking assist device 1 controls only the steering device 50.

The parking assist ECU 10 may be composed of a plurality of ECUs. The parking assist ECU 10 is connected to a plurality of other ECUs via a controller area network (CAN). For example, as illustrated in FIG. 1, the parking assist ECU 10 is connected to a drive ECU 31, a braking ECU 41, a steering ECU 51, a steer-by-wire (SBW) ECU 61, a display ECU 71, and a navigation ECU 81, and can exchange necessary information with the connected ECUs.

The sensor group 20 includes an external sensor 21, a vehicle speed sensor 22, a driver monitor sensor 23, a grip sensor 24, a steering torque sensor 25, a steering rotational angle sensor 26, and a brake pedal sensor 27. The external sensor 21 acquires information about objects and indications that are present around the host vehicle. In the present embodiment, the external sensor 21 includes a sonar sensor 211 and a camera sensor 212.

The sonar sensor 211 intermittently radiates an ultrasonic wave in an area around the host vehicle, and receives an ultrasonic wave (reflected wave) reflected by a three-dimensional object (object). The sonar sensor 211 acquires a distance between the host vehicle and the object, a relative positional relationship between the host vehicle and the object, etc. based on the time since the transmission of the ultrasonic wave to the reception of the reflected wave. The sonar sensor 211 transmits information that indicates the acquired distance and positional relationship to the parking assist ECU 10.

Figure 2:
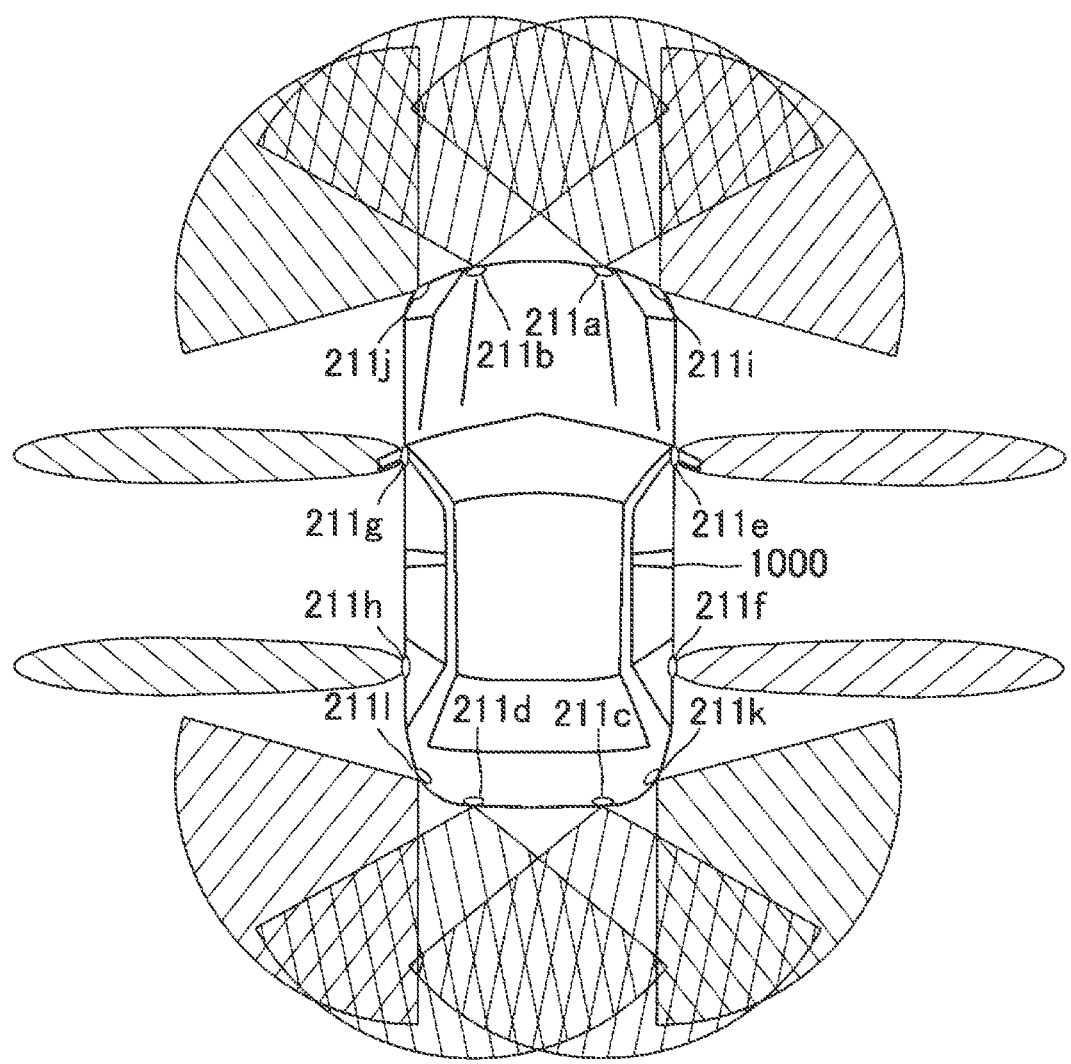
FIG. 2 illustrates an example of the attachment positions of sonar sensors.

In the present embodiment, the host vehicle is provided with a plurality of sonar sensors 211. The sonar sensors 211 are provided on the host vehicle so as to be able to radiate ultrasonic waves substantially all around the host vehicle. For example, as illustrated in FIG. 2, the sonar sensors 211 may include front sonar sensors 211a and 211b, rear sonar sensors 211c and 211d, right sonar sensors 211e and 211f, left sonar sensors 211g and 211h, a front right sonar sensor 211i, a front left sonar sensor 211j, a rear right sonar sensor 211k, and a rear left sonar sensor 211l. The front sonar sensors 211a and 211b radiate ultrasonic waves forward from right and left portions, respectively, at the front end of the host vehicle. The rear sonar sensors 211c and 211d radiate ultrasonic waves rearward from right and left portions, respectively, at the rear end of the host vehicle. The right sonar sensors 211e and 211f radiate ultrasonic waves rightward from front and rear portions, respectively, at the right end of the host vehicle. The left sonar sensors 211g and 211h radiate ultrasonic waves leftward from front and rear portions, respectively, at the left end of the host vehicle. The front right sonar sensor 211i radiates an ultrasonic wave obliquely forward and rightward from the front right end portion of the host vehicle. The front left sonar sensor 211j radiates an ultrasonic wave obliquely forward and leftward from the front left end portion of the host vehicle. The rear right sonar sensor 211k radiates an ultrasonic wave obliquely rearward and rightward from the rear right end portion of the host vehicle. The rear left sonar sensor 211l radiates an ultrasonic wave obliquely rearward and leftward from the rear left end portion of the host vehicle.

The camera sensor 212 includes a camera device and an image analysis device. The camera device is a digital camera that includes a lens and an imaging element constituted of a charge coupled device (CCD) or a complementary metal oxide semiconductor (CMOS) image sensor (CIS), for example. The camera device acquires image data by imaging an area around the host vehicle at a predetermined frame rate. The camera device transmits the image data to the image analysis device. The image analysis device analyzes the acquired image data to acquire information about objects and indications that are present around the host vehicle from the image. For example, the image analysis device recognizes the pattern and shape of a travel road surface, the shape and color of a wall, fence, etc. of a parking spot, parking frame lines marked on a road surface, etc., and transmits image information that indicates the recognition results to the parking assist ECU 10.

Figure 3:
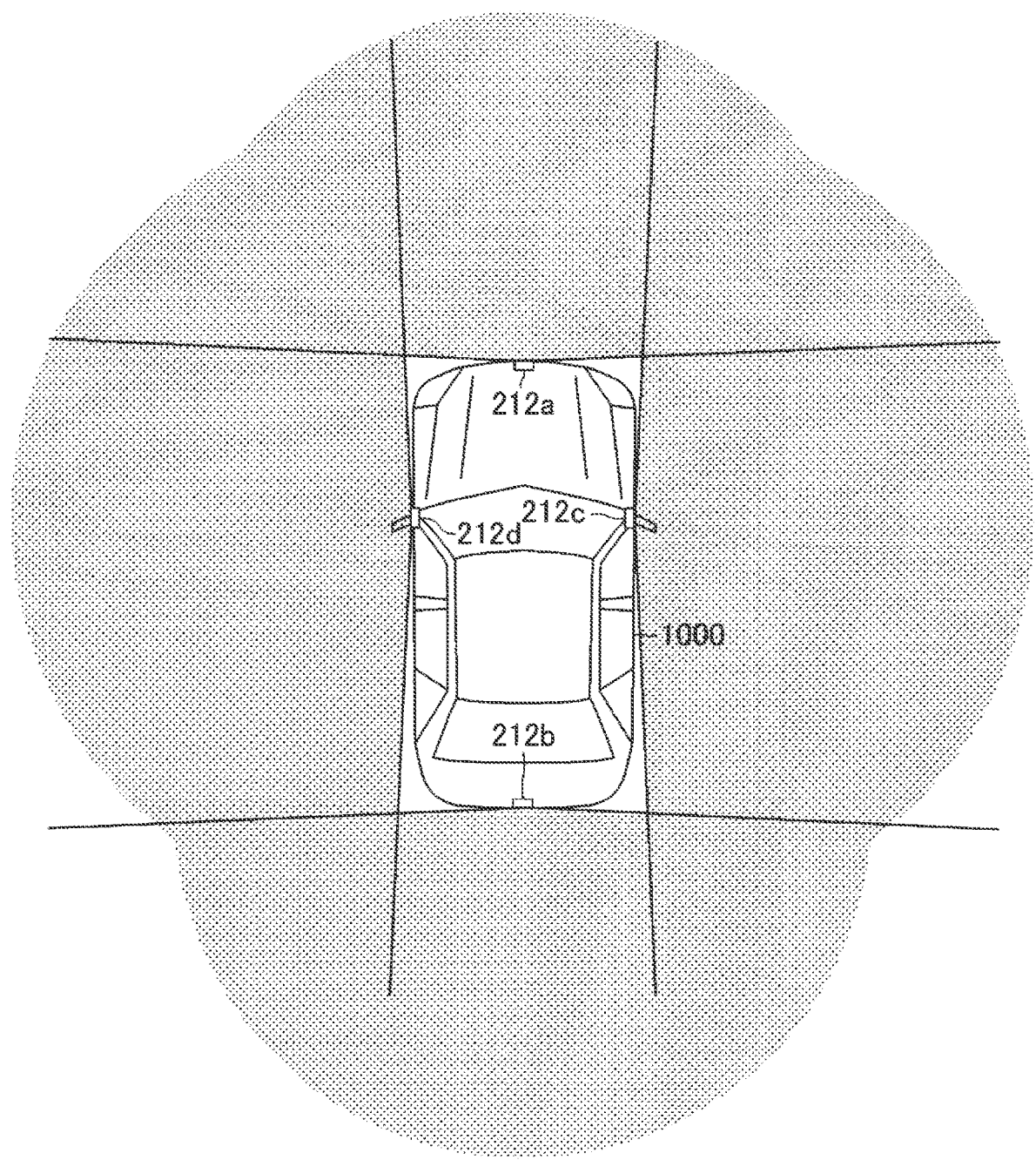
FIG. 3 illustrates an example of the attachment positions of camera sensors.

The camera sensor 212 includes a plurality of camera devices so as to be able to image the entire area around the host vehicle. For example, as illustrated in FIG. 3, the camera devices include a front camera device 212a, a rear camera device 212b, a right side camera device 212c, and a left side camera device 212d. The front camera device 212a images an area forward of the host vehicle. The rear camera device 212b images an area rearward of the host vehicle. The right side camera device 212c images an area on the right side of the host vehicle. The left side camera device 212d images an area on the left side of the host vehicle. The camera devices may have an angle of view of about 180° or more so as to be able to image the entire area around the host vehicle. The camera devices may include infrared camera devices so as to be able to image an area around the host vehicle even at night.

The external sensor 21 may include a radar sensor. The radar sensor is configured to be able to detect an object that is present around the host vehicle using a radio wave in a millimeter wave band. In this case, the radar sensor preferably includes a front radar sensor that radiates a radio wave forward of the host vehicle, a rear radar sensor that radiates a radio wave rearward of the host vehicle, a right side radar sensor that radiates a radio wave to the right side of the host vehicle, and a left side radar sensor that radiates a radio wave to the left side of the host vehicle.

The vehicle speed sensor 22 detects information that indicates the vehicle speed of the host vehicle, and outputs the detected information that indicates the vehicle speed to the parking assist ECU 10. The vehicle speed sensor 22 may be a wheel speed sensor that detects information that indicates the rotational speed of a wheel of the host vehicle.

The driver monitor sensor 23 includes a driver monitor camera device and a driver image generation unit. The driver monitor camera device is attached at a position at which a face of a driver seated on a driver's seat of the host vehicle can be imaged. Image information obtained by the driver monitor camera device is transmitted to the driver image generation unit. The driver image generation unit acquires image information on the driver based on the received image information, and transmits the acquired image information on the driver to the parking assist ECU 10.

The grip sensor 24 is provided on a portion of a steering wheel 53a, to be discussed later, to be grasped by the driver, and configured to be able to detect grip information that indicates whether a hand of the driver is in contact with the steering wheel 53a, that is, whether the driver is grasping the steering wheel 53a. Examples of the grip sensor 24 include a capacitance sensor. The grip sensor 24 transmits the detected grip information to the parking assist ECU 10.

The steering torque sensor 25 is configured to be able to detect information that indicates torque (steering torque) input when the driver operates the steering wheel 53a to be discussed later. The steering torque sensor 25 is attached to a steering shaft that is rotated together with the steering wheel 53a, and detects torsional torque generated by rotating the steering wheel 53a as steering torque, for example. The steering torque sensor 25 transmits information that indicates the detected steering torque to the parking assist ECU 10.

The steering rotational angle sensor 26 is configured to be able to detect information that indicates the rotational angle (hereinafter "steering rotational angle") of the steering wheel 53a to be discussed later. The steering rotational angle indicates the angle by which the steering wheel 53a is rotated from a neutral position (the rotational position of the steering wheel 53a at the time when the host vehicle travels straight forward). The steering rotational angle sensor 26 can detect a positive angle when the steering wheel 53a is rotated in one direction (e.g. rightward) from the neutral position, and detect a negative angle when the steering wheel 53a is rotated in the other direction (e.g. leftward). The steering rotational angle sensor 26 is attached to the steering shaft, for example. The steering rotational angle sensor 26 transmits information that indicates the detected steering rotational angle to the parking assist ECU 10.

The brake pedal sensor 27 is attached to a brake pedal 44 to be discussed later, and configured to be able to detect information that indicates the operation amount of the brake pedal 44. The brake pedal sensor 27 transmits information that indicates the detected operation amount of the brake pedal 44 to the parking assist ECU 10.

The sensor group 20 may include sensors other than the sensors described above. For example, the sensor group 20 may include a shift lever sensor 62 to be discussed later, a yaw rate sensor, an acceleration sensor, an accelerator pedal stroke sensor, etc.

The drive device 30 generates a drive force, and applies the drive force to drive wheels of the host vehicle. The drive device 30 includes the drive ECU 31, a drive actuator 32, a drive source 33, a transmission 34, and a drive force transfer mechanism (not illustrated) that transfers the drive force to the drive wheels. The drive ECU 31 is electrically connected to the drive actuator 32 so as to be able to control operation of the drive actuator 32. The drive actuator 32 is configured to be able to adjust the drive force of the drive source 33. When the drive source 33 is an internal combustion engine, for example, the drive actuator 32 is a throttle valve that can adjust the amount of fuel to be supplied to the internal combustion engine and an opening degree adjustment mechanism that adjusts the opening degree of the throttle valve.

The drive ECU 31 controls a drive force generated by the drive source 33 by controlling operation of the drive actuator 32. The drive force generated by the drive source 33 is transferred to the drive wheels of the host vehicle via the transmission 34 and the drive force transfer mechanism. Thus, the drive ECU 31 can control the drive force of the host vehicle by controlling the drive actuator 32. The parking assist ECU 10 can control the drive actuator 32 via the drive ECU 31 such that the drive force matches a target drive force by transmitting a drive control signal including information that indicates the target drive force to the drive ECU 31 during execution of the automatic parking control. The drive device 30 can also generate a drive force when the driver operates an accelerator pedal provided in the host vehicle.

When the drive source 33 is an internal combustion engine, the drive ECU 31 controls a drive force generated by the internal combustion engine. When the host vehicle is a hybrid electric vehicle (HEV), the drive ECU 31 controls a drive force generated by one or both of an internal combustion engine and an electric motor that serve as the drive source 33. When the host vehicle is a battery electric vehicle (BEV), the drive ECU 31 controls a drive force generated by an electric motor that serves as the drive source 33.

The braking device 40 applies a braking force to the wheels of the host vehicle. The braking device 40 includes the braking ECU 41, a braking actuator 42, and a braking mechanism 43. The braking ECU 41 is electrically connected to the braking actuator 42 so as to be able to control operation of the braking actuator 42. The braking actuator 42 includes a hydraulic circuit, and includes a reservoir, an oil pump, various valve devices, etc. (not illustrated). The braking mechanism 43 includes brake discs, calipers, pistons, and brake pads, and generates a frictional braking force when the brake pads are pressed against the brake discs by hydraulic pressures (i.e. braking pressures) supplied from the braking actuator 42. The host vehicle is braked by the frictional braking force generated by the braking mechanism 43.

The braking actuator 42 adjusts the hydraulic pressures (braking pressures) to be supplied to the braking mechanism 43 in accordance with an instruction from the braking ECU 41. The frictional braking force generated by the braking mechanism 43 is varied in accordance with the braking pressures. Thus, the braking ECU 41 can control the braking force for the host vehicle by controlling the braking actuator 42. The parking assist ECU 10 can control the braking actuator 42 via the braking ECU 41 such that the braking force matches a target braking force by transmitting a braking control signal including information that indicates the target braking force to the braking ECU 41 during execution of the automatic parking control. The braking device 40 can also apply a braking force to the wheels of the host vehicle when the driver operates the brake pedal 44 provided in the host vehicle.

The steering device 50 is a device that operates steering wheels of the host vehicle. The steering device 50 includes the steering ECU 51, a steering actuator 52, and a steering mechanism 53. The steering ECU 51 is electrically connected to the steering actuator 52 so as to be able to control operation of the steering actuator 52. The steering mechanism 53 includes the steering wheel 53a, the steering shaft, a steering gear box, tie rods, etc. The steering mechanism 53 is configured to be able to operate the steering wheels through an operation to rotate the steering wheel 53a. The steering actuator 52 may be an electric motor, for example, and is connected to the steering mechanism 53 so as to be able to apply power for operating the steering wheels to the steering mechanism 53. The steering actuator 52 may also be configured to generate a steering assist force for assisting the driver in operating the steering wheel 53a. The steering ECU 51 controls operation of the steering mechanism 53 by controlling operation of the steering actuator 52. Thus, the steering ECU 51 can control a wheel steering angle that is the steering angle of the steering wheels of the host vehicle by controlling the steering actuator 52. The parking assist ECU 10 can control the steering actuator 52 via the steering ECU 51 such that the wheel steering angle matches a target steering angle by transmitting a steering control signal including information that indicates the target steering angle to the steering ECU 51 during execution of the automatic parking control.

The shift switching device 60 switches a shift position (shift speeds) of the transmission 34. In the present example, the shift position includes at least a parking position, a neutral position, a forward position, and a reverse position. When the shift position is the parking position, the shift switching device 60 mechanically locks the wheels such that a drive force is not transferred to the drive wheels and the wheels are not rotatable. Specifically, when the shift position is the parking position, an output shaft of the transmission 34 is locked so as not to be rotated. Such a state is also referred to as a "parking lock (P lock) state". When the shift position is the neutral position, the shift switching device 60 does not transfer a drive force to the drive wheels. When the shift position is the neutral position, the shift switching device 60 does not mechanically lock the wheels. When the shift position is the forward position, the shift switching device 60 transfers a drive force for advancing the vehicle to the drive wheels. When the shift position is the reverse position, the shift switching device 60 transfers a drive force for reversing the vehicle to the drive wheels.

The shift switching device 60 includes the SBW ECU 61, the shift lever sensor 62, an SBW actuator 63, a shift switching mechanism 64, etc. The term "SBW" is an abbreviation of "shift-by-wire". The SBW ECU 61 is connected to the shift lever sensor 62 and the SBW actuator 63. The shift lever sensor 62 detects the shift position corresponding to an operation of the shift lever. The shift lever is provided to be operable in correspondence with each shift position, and operated by the driver of the host vehicle. The SBW ECU 61 receives the shift position corresponding to an operation of the shift lever from the shift lever sensor 62, and controls the SBW actuator 63 based on the shift position. The SBW actuator 63 actuates the shift switching mechanism 64 in accordance with an instruction from the SBW ECU 61, and switches the shift position of the transmission 34 to one of a plurality of shift positions (parking position, neutral position, forward position, and reverse position). The parking assist ECU 10 can control the SBW actuator 63 via the SBW ECU 61 such that the shift position matches a target shift position by transmitting a shift control signal including information that indicates the target shift position to the SBW ECU 61 during execution of the automatic parking control.

The display device 70 includes the display ECU 71 and a touch panel display 72. The display ECU 71 is connected to the display 72 so as to be able to control the display 72. The display 72 may be a display attached to an instrument panel provided in front of the driver's seat of the host vehicle. The display 72 may be a display that normally displays a map screen. The parking assist ECU 10 can control the display device 70 such that predetermined image information is displayed on the display 72 by transmitting a predetermined display control signal to the display ECU 71. The display device 70 has a function as an informing device that indicates predetermined information via the display 72. The display device 70 also has a function as an input device that receives input of predetermined information input via the display 72.

The navigation device 80 includes the navigation ECU 81 and a global positioning system (GPS) receiver 82. The GPS receiver 82 receives GPS signals for detecting the latitude and longitude of the present position of the host vehicle. The navigation device 80 also includes a map database that stores map information. The navigation ECU 81 specifies the position of the host vehicle on a map by performing various computation processes based on the latitude and longitude of the host vehicle obtained in accordance with the GPS signals received by the GPS receiver 82, the map information, etc. The specified position of the host vehicle is transmitted to the parking assist ECU 10 to be used for the automatic parking control.

The parking assist device 1 according to the present embodiment configured as described above is configured to be able to register a parking spot at which the host vehicle can be parked and a path that leads to the parking spot. A process of registering a parking spot and a path will be described.

The parking assist ECU 10 of the parking assist device 1 monitors the vehicle speed of the host vehicle at all times based on information acquired by the vehicle speed sensor 22. The parking assist ECU 10 executes a path storage process upon detecting that the vehicle speed of the host vehicle is equal to or less than a predetermined reference vehicle speed, e.g. equal to or less than 15 km/h. In the path storage process, the parking assist ECU 10 continuously stores information about a travel path of the host vehicle in a ring buffer area provided in the RAM 10c at predetermined short time intervals. The information continuously stored at predetermined short time intervals include information that allows specifying a travel path of the host vehicle and information that indicates the travel state of the host vehicle in that event. The information that allows specifying a travel path of the host vehicle includes image information about the pattern and shape of a road surface continuously acquired by the parking assist ECU 10 from the camera sensor 212. The information that indicates the travel state of the host vehicle includes information that indicates a steering rotational angle acquired by the parking assist ECU 10 from the steering rotational angle sensor 26, information that indicates a vehicle speed acquired from the vehicle speed sensor 22, and information that indicates a shift position acquired from the shift lever sensor 62. The information that indicates the travel state of the host vehicle is linked to the image information about the pattern and shape of a travel road surface acquired continuously, and continuously acquired in correspondence with the image information. As the parking assist ECU 10 executes the path storage process, information about a travel path of the host vehicle obtained until the present time since a predetermined time earlier is continuously stored when the host vehicle is traveling at a vehicle speed that is equal to or less than the reference vehicle speed.

Now; it is assumed that the host vehicle is heading for a predetermined parking spot, e.g. a parking spot around the home. When the host vehicle approaches the predetermined parking spot to a certain degree, the driver of the host vehicle reduces the vehicle speed of the host vehicle in order to park the host vehicle at the parking spot. In such a case, the parking assist ECU 10 stores information about a travel path of the host vehicle by executing the path storage process.

When the host vehicle approaches a position closest to the predetermined parking spot, the driver of the host vehicle executes parking operation for parking the host vehicle at the parking spot. This allows the host vehicle to be parked at the predetermined parking spot. At this time, the host vehicle may be parked at the predetermined parking spot by the parking assist ECU 10 executing the automatic parking control, or the host vehicle may be parked at the predetermined parking spot by the driver of the host vehicle executing a drive operation. The parking assist ECU 10 keeps storing information about the travel path of the host vehicle also while the parking operation of the host vehicle is executed. That is, information about the travel path of the host vehicle during execution of the parking operation is also stored.

When it is determined that the host vehicle has been parked at the predetermined parking spot, the parking assist ECU 10 stores information that allows specifying the parking spot in the RAM 10c. Examples of the information stored at this time include information about the shape, characteristic points, etc. of the parking spot acquired by the camera sensor 212 and information about the position of the parking spot.

When it is determined that the host vehicle has been parked at the predetermined parking spot, in addition, the parking assist ECU 10 controls the display device 70 such that the display 72 displays an image that allows selecting whether to register the parking spot and the travel path of the host vehicle that leads to the parking spot. When it is selected to register the parking spot and the path that leads to the parking spot, the parking assist ECU 10 stores information about the parking spot stored in the RAM 10c and information about the travel path of the host vehicle that leads to the parking spot in a predetermined storage area in the ROM 10b. Consequently, the parking spot and one travel path of the host vehicle that leads to the parking spot are registered. Hereinafter, the parking spot that has been registered will be referred to as a "registered parking spot", and the one travel path of the host vehicle that has been registered will be referred to as a "registered path".

The parking assist device 1 according to the present embodiment is configured to allow the host vehicle to travel along the registered path and allow the host vehicle to be automatically parked at the registered parking spot by executing the automatic parking control. Such automatic parking control will be described below.

When the host vehicle is to be parked at the registered parking spot, the driver of the host vehicle causes the host vehicle to travel on a travel path (hereinafter a "set path") set to the registered path at a vehicle speed that is equal to or less than a predetermined low speed, e.g. a vehicle speed that is equal to or less than 15 km/h. Meanwhile, the parking assist ECU 10 determines whether the host vehicle is traveling at a position in the vicinity of the registered parking spot and the registered path when the host vehicle is traveling at a vehicle speed that is equal to or less than the predetermined low speed. This determination is made by the GPS receiver 82 first making a comparison between the present position of the host vehicle acquired based on the GPS signals by the GPS receiver 82 and the position of the registered parking spot. When it is determined that the host vehicle is traveling at a position in the vicinity of the registered parking spot and the registered path, the parking assist ECU 10 makes a comparison between image information about the pattern and shape of the present road surface for the host vehicle acquired by the camera sensor 212 and image information about the pattern and shape of a road surface stored to specify the registered path. When it is determined that the degree of coincidence or similarity between the image information about the pattern and shape of the travel road surface acquired by the camera sensor 212 and the image information about the pattern and shape of the stored road surface is equal to or more than a predetermined threshold, the parking assist ECU 10 detects the registered path, and determines that the host vehicle is traveling on the set path.

As discussed in detail later, the host vehicle is occasionally not traveling along the registered path even when the host vehicle is traveling on the set path.

Figure 4:
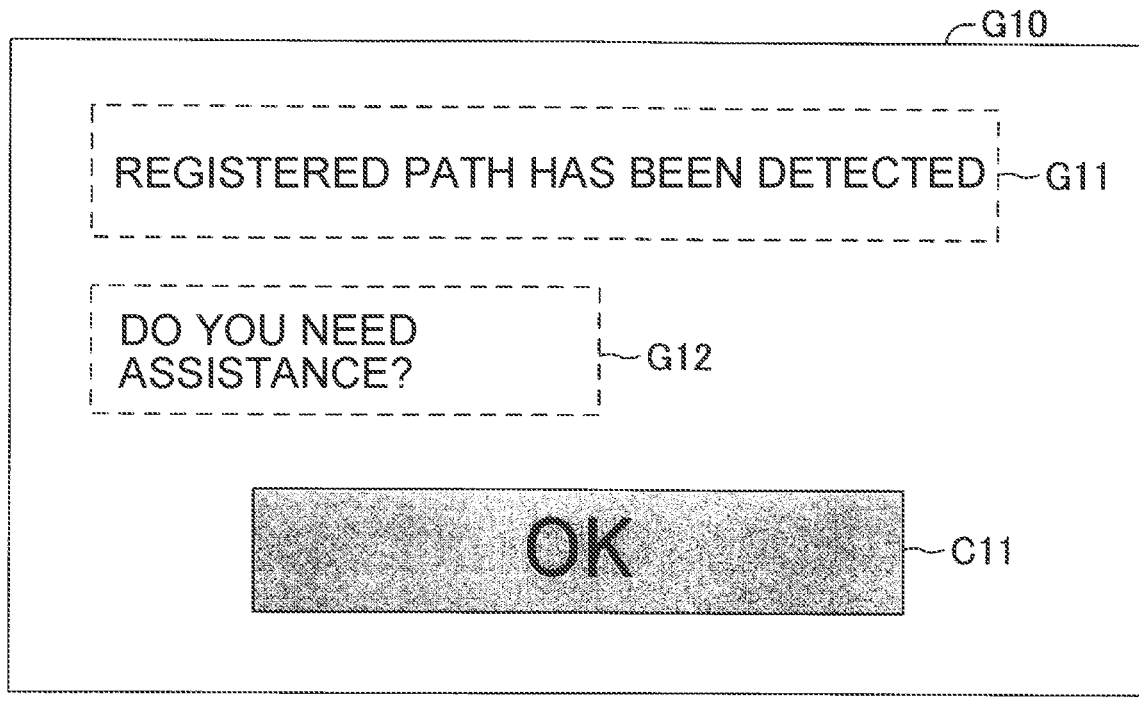
FIG. 4 illustrates an example of a suggestion image.

When it is determined that the host vehicle is traveling on the set path, the parking assist ECU 10 executes a first display process. In the first display process, the parking assist ECU 10 controls the display device 70 such that the display 72 displays a suggestion image that suggests executing the automatic parking control for parking the vehicle at the registered parking spot. FIG. 4 illustrates an example of the suggestion image. As illustrated in FIG. 4, a suggestion image G10 includes a first character image G11, a second character image G12, and a start icon C11. The first character image G11 indicates that a registered path has been detected. The second character image G12 suggests automatic parking control for causing the host vehicle to travel along the registered path and parking the host vehicle at the registered parking spot.

An occupant of the host vehicle taps the start icon C11 when it is desired to execute the automatic parking control. When the start icon C11 is tapped, a start signal is transmitted from the display ECU 71 to the parking assist ECU 10. When the start signal is received, the parking assist ECU 10 starts execution of the automatic parking control. When it is not desired to execute the automatic parking control, on the other hand, the occupant of the host vehicle does not tap the start icon C11. The parking assist ECU 10 controls the display device 70 such that the suggestion image G10 is removed from the display 72 when a predetermined time (e.g. 5 seconds) elapses without receiving a start signal since the suggestion image G10 is displayed on the display 72. In this case, the automatic parking control is not executed.

The parking assist ECU 10 executes the second display process when execution of the automatic parking control is started. In the second display process, the parking assist ECU 10 generates a peripheral image using image data acquired from the camera sensor 212. The peripheral image is an image corresponding to the range of at least a part of a region around the host vehicle, and includes a camera viewpoint image and a virtual viewpoint image.

The camera viewpoint image is an image taken from a position at which the lens of each of the camera devices is disposed as the viewpoint. The virtual viewpoint image is an image in which the host vehicle and an area around the host vehicle are seen from a virtual viewpoint set at a desired position around the host vehicle. There are methods of generating a virtual viewpoint image. (See Japanese Unexamined Patent Application Publication No. 2012-217000 (JP 2012-217000 A), Japanese Unexamined Patent Application Publication No. 2016-192772 (JP 2016-192772 A), Japanese Unexamined Patent Application Publication No. 2018-107754 (JP 2018-107754 A), etc., for example.)

Figure 5:
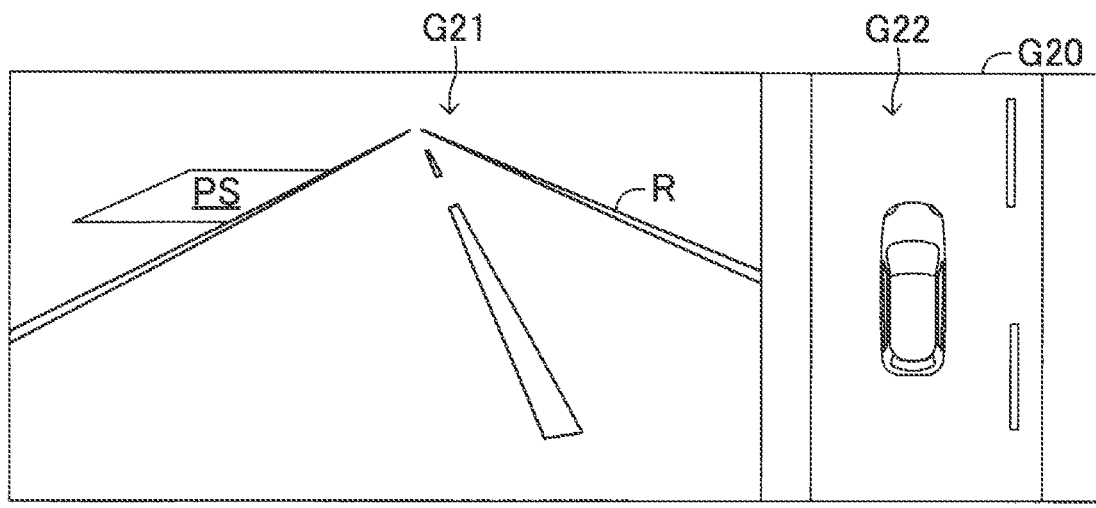
FIG. 5 illustrates an example of a peripheral image displayed on a display through execution of a second display process.

In the second display process, in addition, the parking assist ECU 10 controls the display device 70 such that the display 72 displays a predetermined peripheral image, among the generated peripheral images. FIG. 5 illustrates an example of the peripheral image displayed on the display 72 through execution of the second display process. As illustrated in FIG. 5, a peripheral image G20 includes a first viewpoint image G21 and a second viewpoint image G22. The first viewpoint image G21 is displayed in the left area of the peripheral image G20. The second viewpoint image G22 is displayed in the right area of the peripheral image G20.

The first viewpoint image G21 is a camera viewpoint image imaged by the front camera device 212a. In FIG. 5, a set path R on which the host vehicle is traveling and a registered parking spot PS are illustrated in the first viewpoint image G21. The second viewpoint image G22 is a virtual viewpoint image in which the host vehicle and an area around the host vehicle are seen from directly above the host vehicle.

In addition, the parking assist ECU 10 executes an automated travel process when execution of the automatic parking control is started. In the automated travel process, the parking assist ECU 10 specifies the set path based on information about the travel road surface forward of the host vehicle imaged by the front camera device 212a. In addition, the parking assist ECU 10 controls the drive device 30, the braking device 40, and the steering device 50 such that the host vehicle automatically travels along the set path at a predetermined low speed.

The registered path is stored as image information about the pattern and shape of a road surface acquired by the camera sensor 212 when the host vehicle travels along the registered path. The image information about the pattern and shape of the stored road surface is different among positions in the width direction of the set path. Thus, when the host vehicle follows the same path as a path reproduced in accordance with the image information about the pattern and shape of the stored road surface, the width-direction position of the registered path on the set path and the width-direction position of the travel path on which the host vehicle is traveling must coincide with each other.

Figure 6:
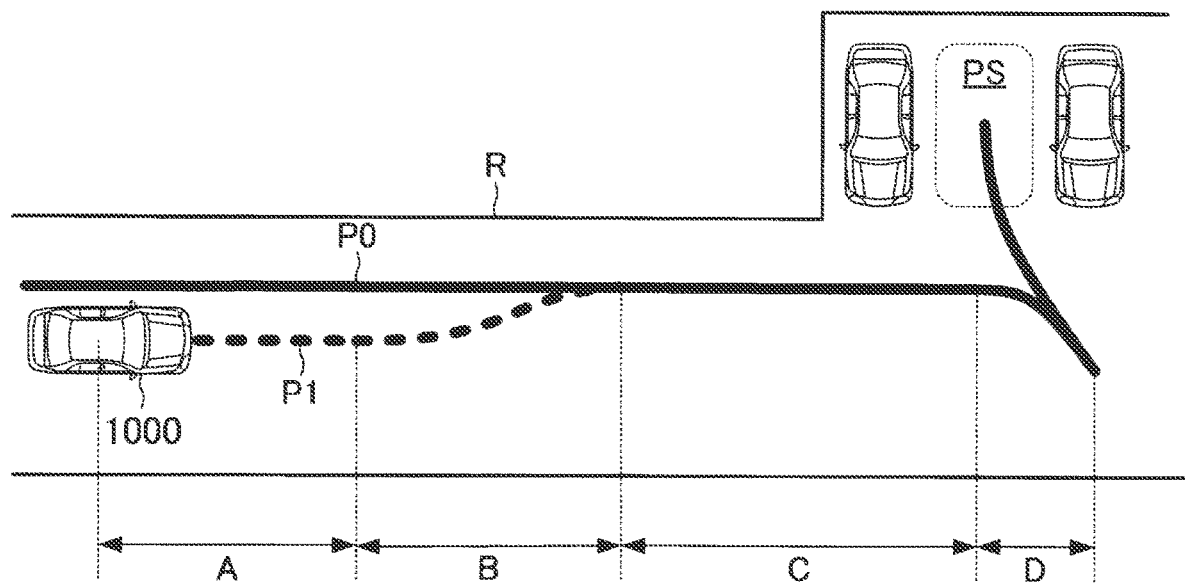
FIG. 6 illustrates a host vehicle traveling through execution of an automated travel process.

However, the width-direction position of the travel path of the host vehicle does not necessarily coincide with the width-direction position of the registered path when the host vehicle is traveling on the set path through execution of the automated travel process. FIG. 6 illustrates the host vehicle traveling through execution of the automated travel process. In FIG. 6, a path indicated by the continuous line is a registered path P0 set in the set path R, and a path indicated by the broken line is a present travel path P1 of the host vehicle. A section A indicated in FIG. 6 is an automated travel section in which the host vehicle travels through execution of the automated travel process. In the automated travel section, as illustrated in FIG. 6, the host vehicle (vehicle 1000) is traveling on the set path R, but is not traveling along the registered path P0. That is, the width-direction position of the travel path P1 of the host vehicle in the automated travel section is displaced from the width-direction position of the registered path P0. In addition, the registered path P0 is set along the set path R. and the host vehicle traveling through execution of the automated travel process travels along the set path R. Thus, the host vehicle is controlled such that the host vehicle travels in parallel with the registered path P0 in the set path R when the parking assist ECU 10 executes the automated travel process.

In a situation in which the host vehicle is traveling on a path displaced in the width direction with respect to the registered path P0, the host vehicle cannot be parked at the registered parking spot through the automatic parking control. Thus, the parking assist ECU 10 finishes execution of the automated travel process and starts execution of a merging process at a predetermined timing. In the merging process, the parking assist ECU 10 controls the host vehicle such that the width-direction position of the travel path of the host vehicle on the set path coincides with the width-direction position of the registered path. That is, in the merging process, the host vehicle is controlled such that the travel path P1 of the host vehicle is merged with the registered path P0. In this case, the parking assist ECU 10 makes a comparison between image information about the pattern and shape of the road surface acquired from the camera sensor 212 and image information about the pattern and shape of the road surface stored to specify the registered path, and estimates a steering direction of the host vehicle for matching the two pieces of image information, for example. The parking assist ECU 10 controls the steering device 50 such that the host vehicle is steered in the estimated steering direction. The parking assist ECU 10 determines that the travel path of the host vehicle coincides with the registered path when the image information about the pattern and shape of the road surface acquired by the camera sensor 212 and the stored image information about the pattern and shape of the road surface substantially coincide with each other. That is, it is determined that the merging process has been completed.

Figure 7:
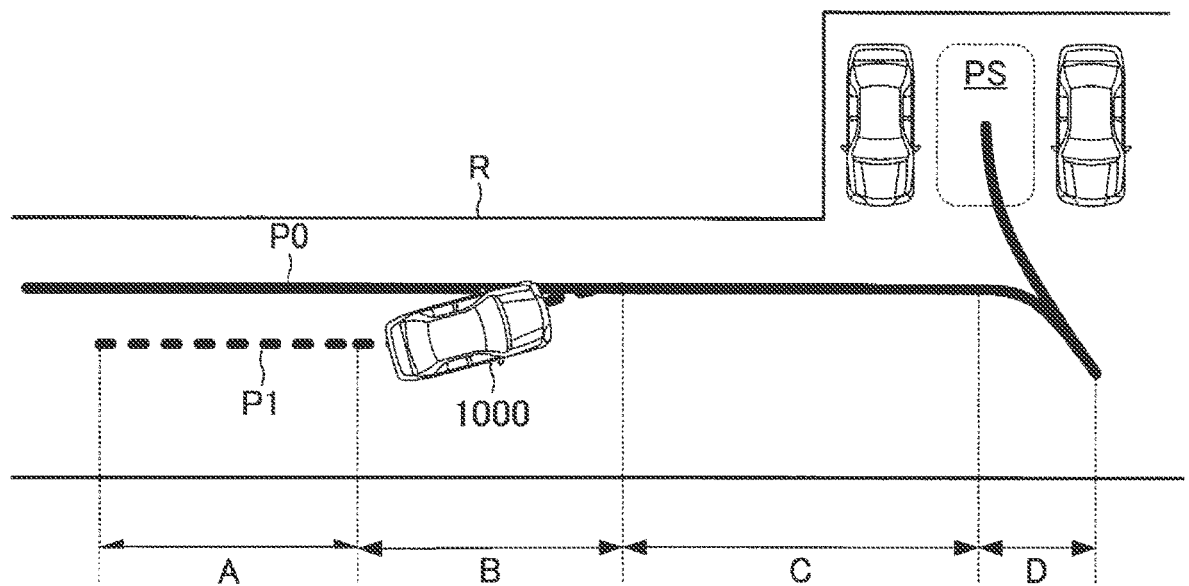
FIG. 7 illustrates the host vehicle traveling through execution of a merging process.

FIG. 7 illustrates the host vehicle traveling through execution of the merging process. As illustrated in FIG. 7, a section B in which the host vehicle (vehicle 1000) travels since the start of the merging process until the completion of the merging process is a merging section. In the merging section, the parking assist ECU 10 controls the steering device 50 such that the travel path P1 of the host vehicle coincides with the registered path P0. In this case, the steering wheel 53a is occasionally automatically rotated significantly. For example, the steering wheel 53a may be rotated by 90 degrees or more from the neutral position in the merging section B.

The timing to start the merging process can be set based on various conditions. For example, the host vehicle can be caused to travel while decelerating until the vehicle speed of the host vehicle coincides with a predetermined low speed (e.g. 10 km/h) through the automated travel process, and the merging process can be started at the timing when the vehicle speed of the host vehicle coincides with the predetermined low speed. Alternatively, the merging process can be started at the timing when a predetermined time elapses since the start of execution of the automated travel process, for example.

Figure 8:
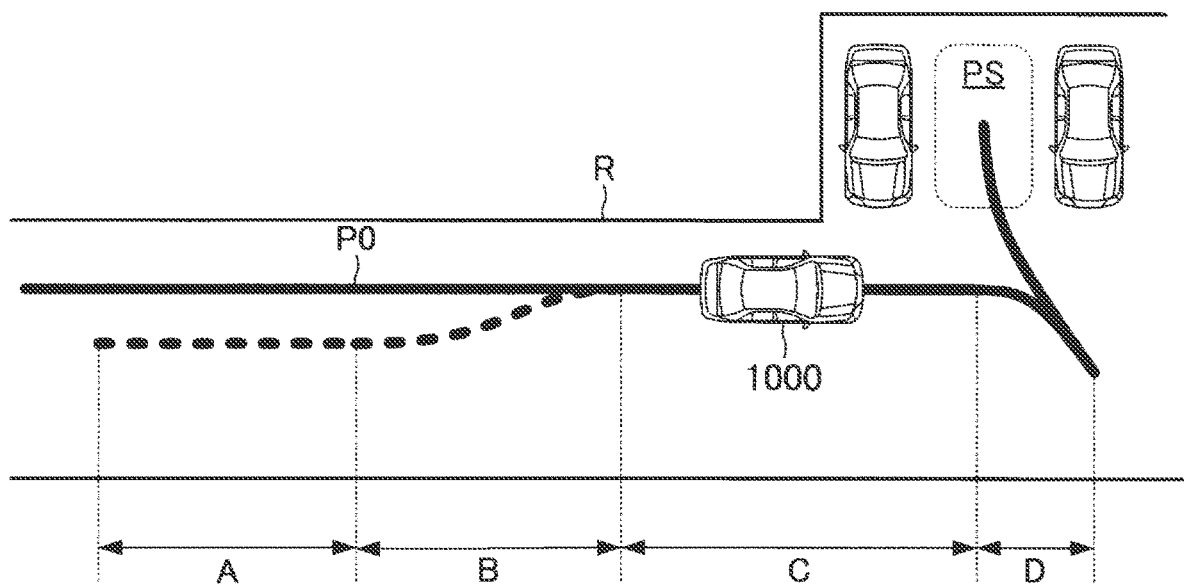
FIG. 8 illustrates the host vehicle during execution of a path travel process.

When the merging process is completed, the parking assist ECU 10 finishes the merging process, and executes a path travel process. In the path travel process, the parking assist ECU 10 controls the host vehicle such that the host vehicle automatically travels along the registered path. In this case, the parking assist ECU 10 controls the drive device 30, the braking device 40, and the steering device 50 of the host vehicle based on image information about the pattern and shape of the road surface acquired from the camera sensor 212, image information about the pattern and shape of the road surface stored to specify the registered path, and the travel state of the host vehicle stored in correspondence with the stored image information. This allows the host vehicle to automatically travel along the registered path. FIG. 8 illustrates the host vehicle during execution of the path travel process. As illustrated in FIG. 8, a section C in which the host vehicle travels through execution of the path travel process is a path travel section. The host vehicle travels along the registered path P0 through the path travel process.

Figure 9:
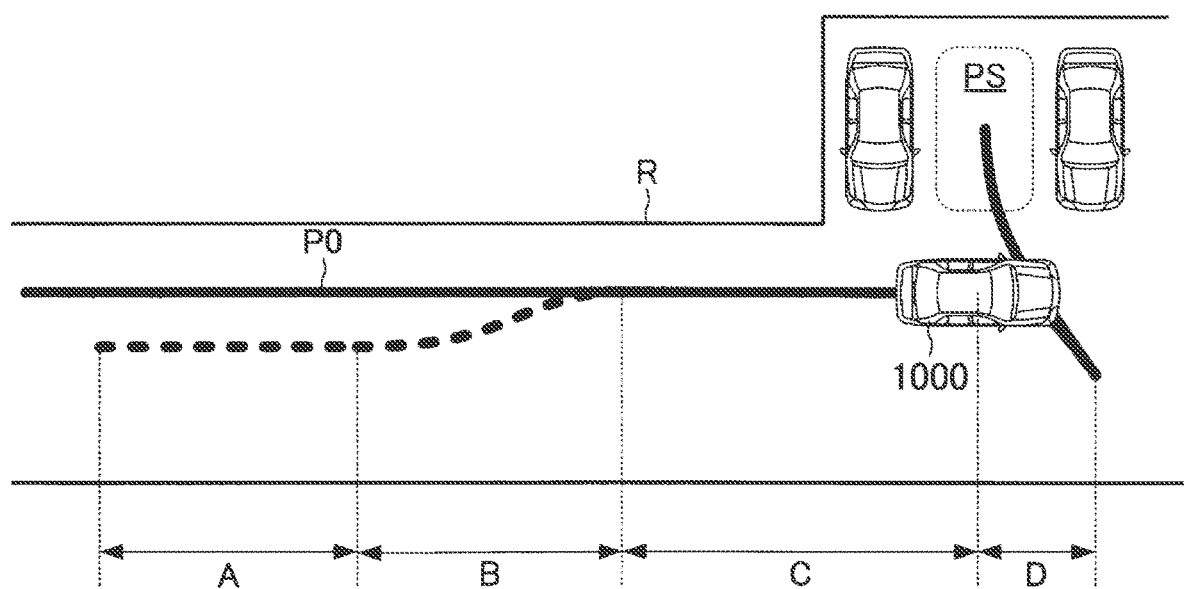
FIG. 9 illustrates the host vehicle stopped at a predetermined position around a registered parking spot through execution of a stopping process.

The parking assist ECU 10 executes a stopping process when the host vehicle arrives at the vicinity of the registered parking spot through execution of the path travel process. In the stopping process, the parking assist ECU 10 controls the drive device 30, the braking device 40, and the steering device 50 of the host vehicle such that the host vehicle is stopped at a predetermined position on the registered path and around the registered parking spot. Consequently, the host vehicle is stopped at a predetermined position around the registered parking spot. FIG. 9 illustrates the host vehicle stopped at a predetermined position around the registered parking spot PS through execution of the stopping process. In the present embodiment, as illustrated in FIG. 9, the host vehicle is stopped at a position around the registered parking spot PS with the left side surface of the host vehicle facing the frontage (entrance) of the registered parking spot PS. The position at which the host vehicle is stopped through the stopping process can be set as desired. For example, the parking assist ECU 10 can park the host vehicle at a position immediately before the posture of the host vehicle is significantly changed in order to park the host vehicle at the registered parking spot through execution of the stopping process.

When the host vehicle is stopped at a predetermined position around the registered parking spot through execution of the stopping process, the parking assist ECU 10 controls the display device 70 such that the display 72 displays an image that instructs the driver of the host vehicle to depress the brake pedal 44 of the host vehicle. The driver of the host vehicle depresses the brake pedal 44 of the host vehicle in accordance with an instruction on the display 72, confirms safety around the vehicle, and thereafter releases the brake pedal 44. The parking assist ECU 10 starts execution of a parking process when it is detected that the brake pedal 44 has been released.

In the parking process, the parking assist ECU 10 controls the host vehicle such that the host vehicle moves along the registered path from a stopped position. Consequently, the host vehicle is controlled so as to execute parking operation to be parked at the registered parking spot. The registered path includes a path on which the host vehicle is parked at the registered parking spot through the parking process. Thus, parking of the host vehicle at the registered parking spot is completed by controlling the host vehicle so as to be moved along the registered path through execution of the parking process. That is, the parking process is considered as a part of the path travel process.

Figure 10:
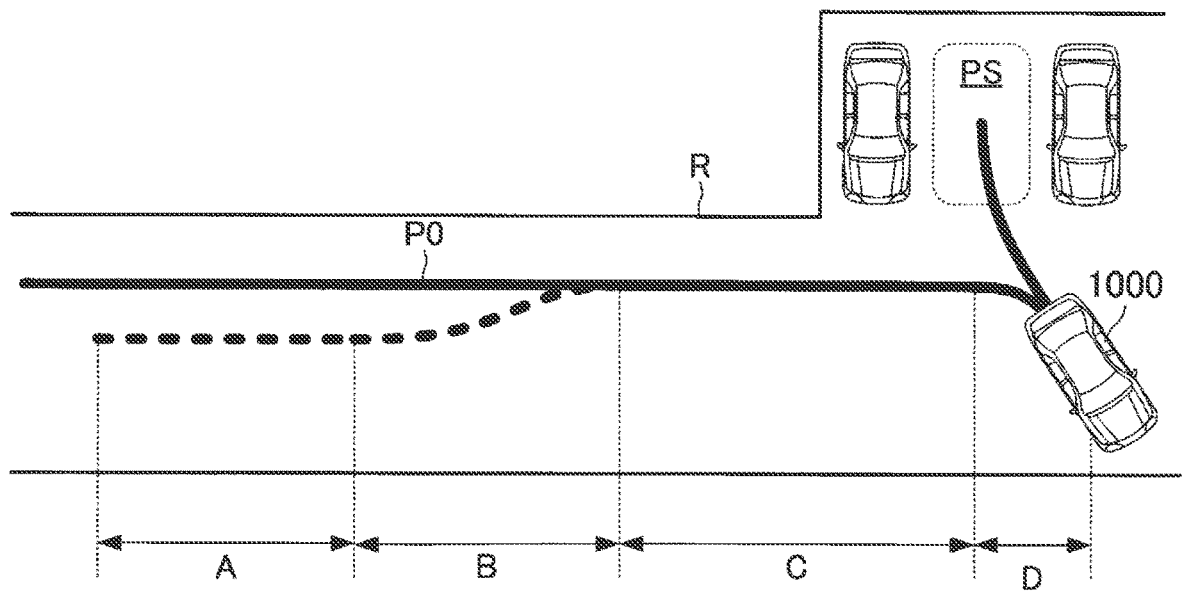
FIG. 10 illustrates the host vehicle temporarily stopped at a switch-back position.

During execution of the parking process, the parking assist ECU 10 controls the host vehicle such that the host vehicle travels on the registered path while making a comparison between the image information about the pattern and shape of the road surface stored to specify the registered path near the registered parking spot and the image information about the pattern and shape of the road surface acquired from the camera sensor 212. When controlling the parking operation of the host vehicle, the travel state (steering rotational angle, vehicle speed, host vehicle position, and shift position) of the host vehicle stored in connection with the image information stored to specify the registered path near the registered parking spot is referenced. Consequently, the parking assist device 1 assists an operation of moving the host vehicle to park the host vehicle at the registered parking spot. In the present embodiment, the host vehicle is advanced from the stopped position to a predetermined switch-back position and temporarily stopped at the switch-back position through execution of the parking process. After that, the host vehicle is reversed from the switch-back position to a predetermined position in the registered parking spot. FIG. 10 illustrates the host vehicle temporarily stopped at the switch-back position. In FIG. 10, a section D is a parking process section in which the host vehicle is moved through execution of the parking process.

Figure 11:
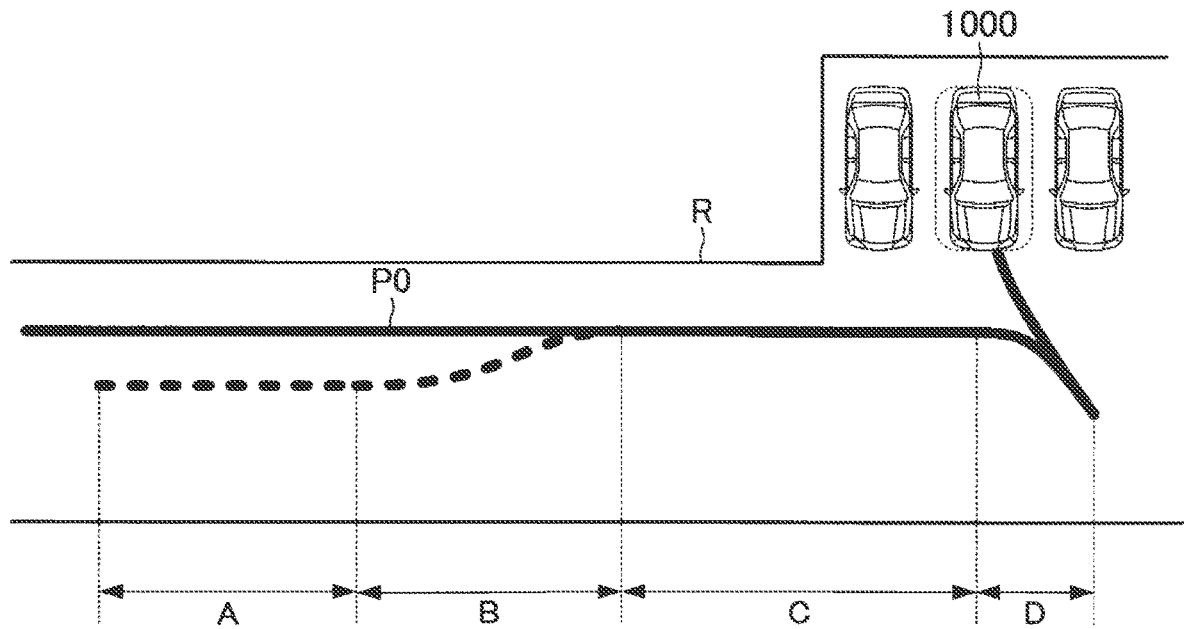
FIG. 11 illustrates the host vehicle at the time when execution of a parking process has been finished.

When the host vehicle arrives at a predetermined position in the registered parking spot through execution of the parking process, the parking assist ECU 10 finishes the parking process. FIG. 11 illustrates the host vehicle at the time when execution of the parking process has been finished. As illustrated in FIG. 11, the host vehicle is parked at a predetermined position in the registered parking spot when execution of the parking process is finished.

The parking assist ECU 10 executes a finishing process when execution of the parking process is finished. In the finishing process, the parking assist ECU 10 actuates the SBW actuator 63 such that the shift position of the host vehicle is brought to the parking position. Consequently, parking lock of the host vehicle is applied. In the finishing process, the parking assist ECU 10 controls the display device 70 or a speaking device such that the display 72 indicates that parking of the host vehicle has been completed or the speaking device generates voice guidance indicating that parking of the host vehicle has been completed. The parking assist ECU 10 ends the automatic parking control after execution of the finishing process.

When a predetermined finishing condition is met during execution of the automatic parking control, the parking assist ECU 10 suspends or cancels the automatic parking control. Examples of the predetermined finishing condition may include a condition that the accelerator pedal or the brake pedal 44 of the host vehicle is operated by the driver. Other examples of the predetermined finishing condition may include a condition that the steering torque sensor 25 detects steering torque T that is larger than predetermined threshold torque when the steering wheel 53a of the host vehicle is operated by the driver.

Figure 12:
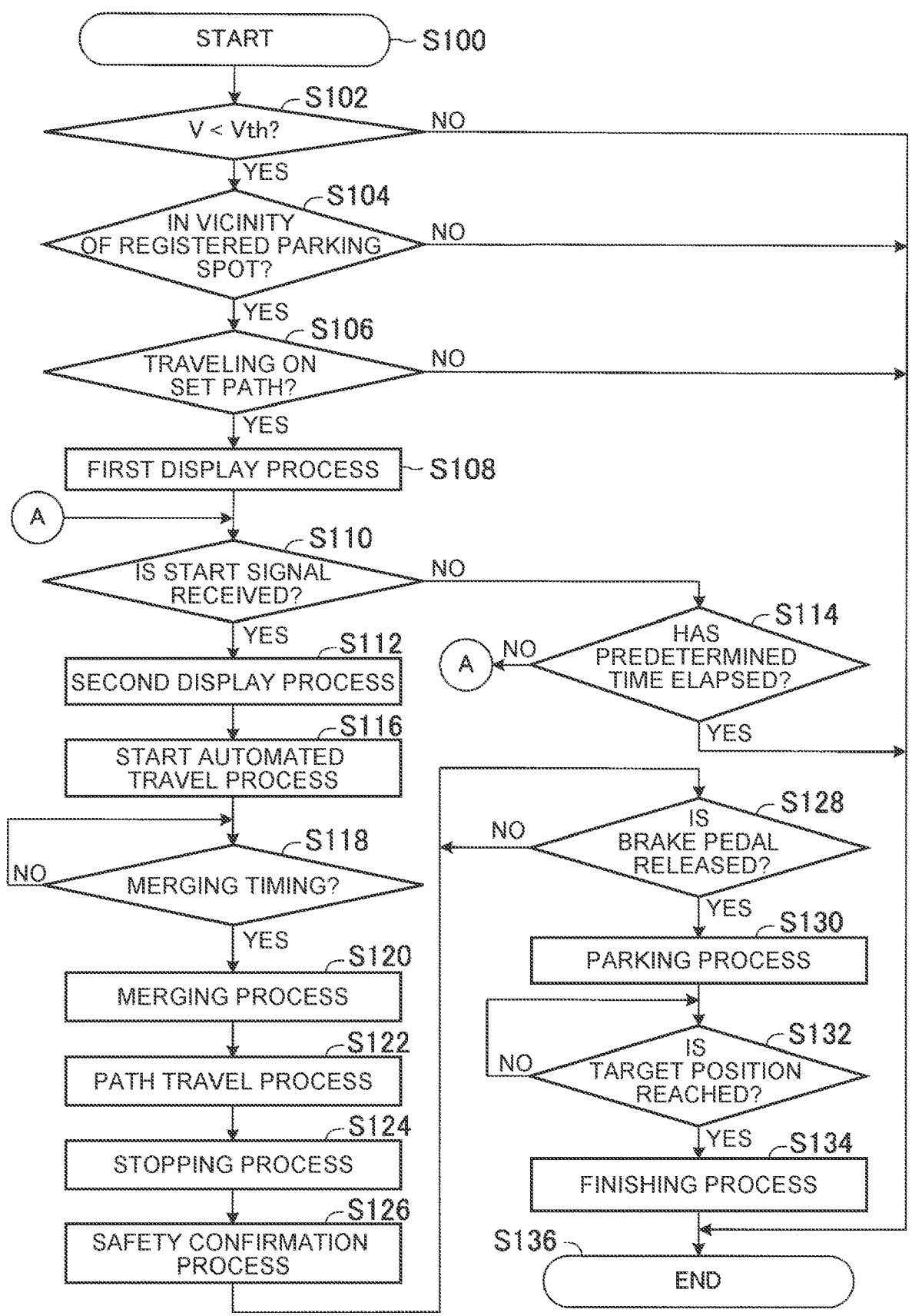
FIG. 12 is a flowchart illustrating an example of an automatic parking control routine executed by a parking assist ECU.

FIG. 12 is a flowchart illustrating an example of a vehicle control routine executed by the parking assist ECU 10 in order to execute the automatic parking control described above. The vehicle control routine illustrated in this flowchart is started when the host vehicle is started, and repeatedly executed at predetermined short time intervals. When the vehicle control routine is started, the parking assist ECU 10 starts execution of the routine at step (hereinafter abbreviated as "S") 100, and advances the process to S102.

In S102, the parking assist ECU 10 determines whether a present vehicle speed V of the host vehicle is less than a predetermined threshold vehicle speed Vth. The threshold vehicle speed Vth can be set to 15 km/h, for example.

When it is determined that the present vehicle speed V of the host vehicle is not less than the threshold vehicle speed Vth (S102: No), the parking assist ECU 10 advances the process to S136, and temporarily ends execution of the routine. When it is determined that the present vehicle speed V of the host vehicle is less than the threshold vehicle speed Vth (S102: Yes), on the other hand, the parking assist ECU 10 advances the process to S104.

In S104, the parking assist ECU 10 determines based on the GPS signals acquired by the GPS receiver 82 whether the present position of the host vehicle is a position in the vicinity of the registered parking spot and the registered path. In this case, the parking assist ECU 10 determines whether the position of the registered parking spot is included in a circle of a predetermined radius (e.g. 50 m) from the present position of the host vehicle computed based on the GPS signals acquired by the GPS receiver 82, for example.

When it is determined that the present position of the host vehicle is not a position in the vicinity of the registered path or the registered parking spot (S104: No), the parking assist ECU 10 advances the process to S136, and temporarily ends execution of the routine. When it is determined that the present position of the host vehicle is a position in the vicinity of the registered path, on the other hand, the parking assist ECU 10 advances the process to S106.

In S106, the parking assist ECU 10 determines whether the host vehicle is traveling on the set path. When it is determined that the host vehicle is not traveling on the set path (S106: No), the parking assist ECU 10 advances the process to S136, and temporarily ends execution of the routine. When it is determined that the host vehicle is traveling on the set path (S106: Yes), on the other hand, the parking assist ECU 10 advances the process to S108.

In S108, the parking assist ECU 10 executes the first display process. Consequently, the suggestion image G10 such as that illustrated in FIG. 4 is displayed on the display 72. Then, the parking assist ECU 10 advances the process to S110.

In S110, the parking assist ECU 10 determines whether a start signal has been received. When it is determined that a start signal has not been received (S110: No), the parking assist ECU 10 advances the process to S114, and determines whether a predetermined time (e.g. 5 seconds) has elapsed since the start of execution of the first display process. When it is determined that a predetermined time has not elapsed (S114: No), the parking assist ECU 10 repeatedly performs the process in S110. When it is determined that a predetermined time has elapsed (S114: Yes), on the other hand, the parking assist ECU 10 ends execution of the first display process, advances the process to S136, and temporarily ends execution of the routine.

When it is determined in S110 that a start signal has been received (S110: Yes), meanwhile, the parking assist ECU 10 starts execution of the automatic parking control. When the automatic parking control is started, the parking assist ECU 10 advances the process to S112. In S112, the parking assist ECU 10 executes the second display process. Consequently, the peripheral image G20 such as that illustrated in FIG. 5 is displayed on the display 72. Then, the parking assist ECU 10 advances the process to S116. In S116, the parking assist ECU 10 starts execution of the automated travel process. Consequently, the drive device 30, the braking device 40, and the steering device 50 of the host vehicle are controlled such that the host vehicle travels in the vicinity of the registered path P0 in parallel with the set path R as illustrated in FIG. 6.

After execution of the automated travel process is started in S116, the parking assist ECU 10 advances the process to S118, and determines whether the present time is a timing (merging timing) to start the merging process. When the host vehicle is controlled so as to decelerate through the automated travel process, for example, when setting a merging timing, the merging timing can be set to a time when the vehicle speed of the host vehicle has been reduced to a vehicle speed determined in advance as a vehicle speed (e.g. 10 km/h) to start the merging process. Alternatively, the merging timing can be set to a time when a predetermined time has elapsed since the start of execution of the automated travel process.

When it is determined in S118 that the present time is not the merging timing (S118: No), the parking assist ECU 10 repeatedly makes the determination in S118. When it is determined in S118 that the present time is the merging timing (S118: Yes), on the other hand, the parking assist ECU 10 advances the process to S120.

In S120, the parking assist ECU 10 executes the merging process. Consequently, the steering device 50 is controlled such that the travel path of the host vehicle coincides with the registered path. In S120, in addition, the parking assist ECU 10 determines whether the travel path of the host vehicle coincides with the registered path. When it is determined that the travel path of the host vehicle does not coincide with the registered path, the parking assist ECU 10 continues execution of the merging process. When it is determined that the travel path of the host vehicle coincides with the registered path, on the other hand, the parking assist ECU 10 finishes the merging process, and advances the process to S122.

In S122, the parking assist ECU 10 executes the path travel process. Consequently, the drive device 30, the braking device 40, and the steering device 50 are controlled such that the host vehicle travels along the registered path. In S122, in addition, the parking assist ECU 10 determines whether the host vehicle has arrived at a position in the vicinity of the registered parking spot based on the position of the host vehicle computed from the GPS signals acquired by the GPS receiver 82 and position information on the registered parking spot. When it is determined that the host vehicle has not arrived at a position in the vicinity of the registered parking spot, the parking assist ECU 10 continues execution of the path travel process. When it is determined that the host vehicle has arrived at a position in the vicinity of the registered parking spot, on the other hand, the parking assist ECU 10 advances the process to S124.

In S124, the parking assist ECU 10 executes the stopping process. Consequently, the drive device 30, the braking device 40, and the steering device 50 of the host vehicle are controlled such that the host vehicle is stopped at a predetermined position on the registered path and around the registered parking spot. In S124, in addition, the parking assist ECU 10 determines whether the host vehicle has been stopped at a predetermined position around the registered parking spot by making a comparison between the image information about the pattern and shape of the road surface acquired by the camera sensor 212 and the image information about the pattern and shape of the road surface stored to specify the registered path near the registered parking spot. When it is determined that the host vehicle has not been stopped at a predetermined position around the registered parking spot, the parking assist ECU 10 continues execution of the stopping process. When it is determined that the host vehicle has been stopped at a predetermined position around the registered parking spot, on the other hand, the parking assist ECU 10 ends execution of the stopping process, and advances the process to S126.

In S126, the parking assist ECU 10 executes a safety confirmation process. In the safety confirmation process, the parking assist ECU 10 controls the display device 70 such that the display 72 displays an image that prompts the driver of the host vehicle to depress the brake pedal 44 of the host vehicle and confirm safety around the vehicle. In S126, in addition, the parking assist ECU 10 determines based on information acquired by the brake pedal sensor 27 whether the brake pedal 44 has been depressed. When it is determined that the brake pedal 44 has not been depressed, the parking assist ECU 10 continues execution of the safety confirmation process. When it is determined that the brake pedal 44 has been depressed, on the other hand, the parking assist ECU 10 ends execution of the safety confirmation process, and advances the process to S128.

In S128, the parking assist ECU 10 determines based on information acquired by the brake pedal sensor 27 whether the brake pedal 44 has been released. When it is determined that the brake pedal 44 has not been released, the parking assist ECU 10 repeatedly performs the process in S128. When it is determined that the brake pedal 44 has been released, on the other hand, the parking assist ECU 10 advances the process to S130. Before performing the process in S128, the parking assist ECU 10 can control the display device 70 such that the display 72 displays an image indicating that the parking process will be started when the brake pedal is released.

In S130, the parking assist ECU 10 starts execution of the parking process. Consequently, parking operation to park the host vehicle at a parking spot is started. Then, the parking assist ECU 10 advances the process to S132.

In S132, the parking assist ECU 10 determines whether the host vehicle has arrived at a predetermined target parking position in the registered parking spot by making a comparison between the information acquired by the camera sensor 212 and the information for specifying the registered parking spot. When the host vehicle has not arrived at the target parking position (S132: No), the parking assist ECU 10 repeatedly makes the determination in S132. When it is determined that the host vehicle has arrived at the predetermined target parking position (S132: Yes), on the other hand, the parking assist ECU 10 advances the process to S134.

In S134, the parking assist ECU 10 executes the finishing process. A notification that parking of the host vehicle has been completed is made through execution of the finishing process. After that, the parking assist ECU 10 ends the automatic parking control, advances the process to S136, and ends the routine.

As described above, the automatic parking control is performed by the parking assist ECU 10 executing the processes in S112 to S134 in FIG. 12. In such automatic parking control, the host vehicle is guided to the registered parking spot along the registered path to be parked at the registered parking spot, and the distance over which the host vehicle is moved through the control is longer than that in control in which the host vehicle is simply parked at a parking spot. Therefore, there is a higher possibility that an unexpected event occurs during execution of the automatic parking control. Hence, it is necessary that the parking assist ECU 10 should monitor the state of the driver and provide the driver with a predetermined warning as necessary, in order to allow the driver to immediately handle an unexpected event when such an event actually occurs.

For example, the driver of the host vehicle must look forward attentively while grasping the steering wheel 53$a$, in order to be able to perform an emergency avoidance operation for avoiding a collision between the host vehicle and an obstacle etc. that unexpectedly appears in front of the host vehicle during execution of the automatic parking control. Hence, the parking assist ECU 10 executes warning control in which the parking assist ECU 10 monitors the driver during execution of the automatic parking control and provides the driver with predetermined warning information when it is found that the driver is in an unsafe state. The unsafe state is a state of the driver that hinders the driver from quickly performing an emergency avoidance operation. For example, the driver is hindered from quickly performing an emergency avoidance operation in states in which the driver is not grasping the steering wheel 53$a$, the driver keeps his/her eyes closed, the driver is looking aside, and the driver is in a poor posture. Hence, such states are each an unsafe state.

Figures 13, 14:
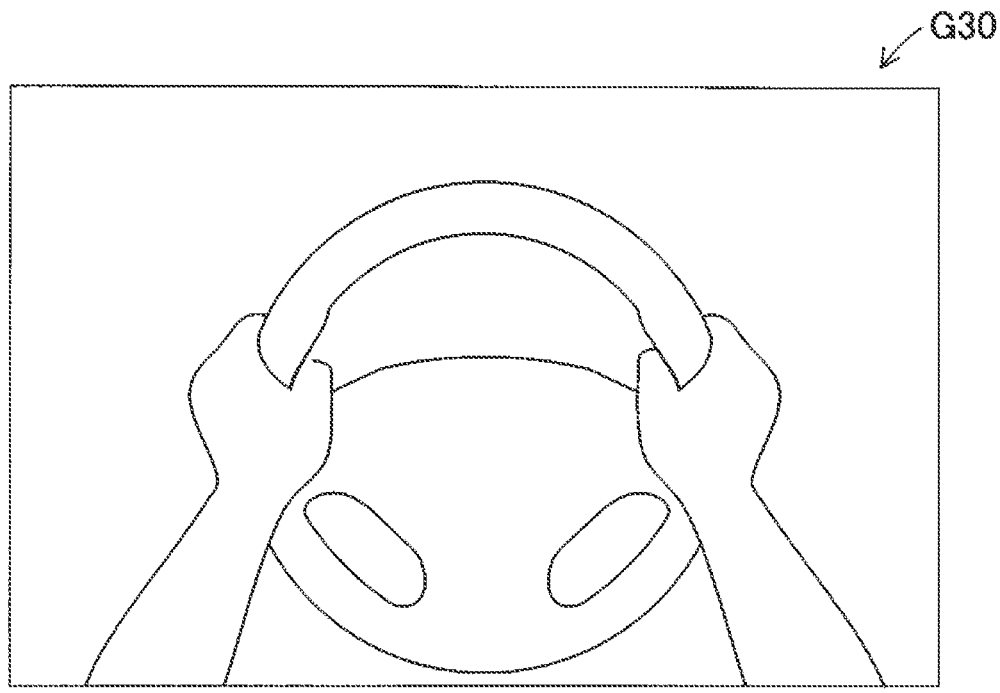
FIG. 13 illustrates an example of a first warning image.
FIG. 14 illustrates an example of a second warning image.

In the present embodiment, the parking assist ECU 10 determines whether the steering wheel 53$a$ is grasped based on information detected by the grip sensor 24 during execution of the automatic parking control. When it is determined that the steering wheel 53$a$ is not grasped, the parking assist ECU 10 executes first warning control. In the first warning control, the parking assist ECU 10 provides information that suggests grasping the steering wheel 53$a$. For example, the parking assist ECU 10 controls the display device 70 such that the display 72 displays a first warning image that suggests grasping the steering wheel 53$a$. FIG. 13 illustrates an example of the first warning image. As illustrated in FIG. 13, a first warning image G30 is an image that illustrates a state in which a driver is grasping a steering wheel.

The driver of the host vehicle grasps the steering wheel 53$a$ when the first warning image G30 is displayed on the display 72. In addition, the parking assist ECU 10 controls the display device 70 such that the display 72 does not display the first warning image G30 when it is detected that the steering wheel 53$a$ has been grasped based on information detected by the grip sensor 24 when the first warning image G30 is displayed on the display 72.

In addition, the parking assist ECU 10 detects an unsafe state of the driver based on information detected by the driver monitor sensor 23 during execution of the automatic parking control. For example, the parking assist ECU 10 detects the driver keeping his/her eyes closed, looking aside, and being in a poor posture based on information detected by the driver monitor sensor 23. When an unsafe state of the driver is detected, the parking assist ECU 10 executes second warning control. In the second warning control, the parking assist ECU 10 controls the display device 70 such that the display 72 displays a second warning image indicating that an unsafe state has been detected. FIG. 14 illustrates an example of the second warning image. FIG. 14 illustrates a character image G41 that indicates detection of closed eyes, a character image G42 that indicates detection of looking aside, and a character image G43 that indicates detection of a poor posture. The display 72 displays the character image G41 when the parking assist ECU 10 detects that the eyes of the driver are closed. The display 72 displays the character image G42 when the parking assist ECU 10 detects that the driver is looking aside. The display 72 displays the character image G43 when the parking assist ECU 10 detects that the driver is in a poor posture. When the parking assist ECU 10 detects a plurality of unsafe states, the display 72 displays character images that indicate detection of the respective unsafe states.

When the display 72 displays a character image that indicates detection of an unsafe state, the driver of the host vehicle resolves the displayed unsafe state. Consequently, safety can be enhanced during execution of the automatic parking control. When it is determined that an unsafe state is not detected based on information acquired by the driver monitor sensor 23 during execution of the automatic parking control, the parking assist ECU 10 controls the display device 70 such that the display 72 does not display a character image that indicates detection of an unsafe state.

In this manner, the parking assist ECU 10 according to the present embodiment is configured to be able to execute warning control (first warning control, second warning control) in which the display device 70 is controlled such that the display 72 of the display device 70 displays predetermined warning information (first warning image G30, second warning images G41, G42, G43) when it is found that the driver of the host vehicle is in an unsafe state, including a state in which the driver is not grasping the steering wheel 53$a$ of the host vehicle, during execution of the automatic parking control.

During execution of the automatic parking control, the steering wheel 53$a$ of the host vehicle is occasionally automatically rotated significantly. For example, the steering wheel 53$a$ is automatically rotated significantly when the parking assist ECU 10 executes the merging process and the host vehicle is traveling in the merging section as illustrated in FIG. 7. In addition, the steering wheel 53$a$ is occasionally automatically rotated significantly when changing the posture of the host vehicle in order to park the host vehicle at the registered parking spot during execution of the parking process as illustrated in FIG. 10. It is highly necessary to confirm safety around the vehicle when the steering wheel 53$a$ is rotated significantly. The driver cannot look forward attentively or may be in a poor posture when the driver confirms safety around the vehicle. Thus, the driver cannot follow warning even if the second warning control is executed in such a situation, or cannot confirm safety around the vehicle if the driver follows the warning. Hence, it is desirable that indication of warning information made through the warning control should be restricted in such a situation.

When the first warning control is executed when the steering wheel 53$a$ is rotated significantly, the driver grasps the steering wheel 53$a$ being rotated, and therefore the driver may grasp the steering wheel 53$a$ so strongly as to hinder rotation of the steering wheel 53$a$. In this case, the steering torque T that acts on the steering wheel 53$a$ may exceed the threshold torque. In such a case, the finishing process is executed to suspend or cancel the automatic parking control. That is, execution of the automatic parking control by the parking assist ECU 10 may be hindered when the first warning control is performed when the steering wheel 53*a* is rotated significantly. Hence, it is desirable that indication of warning information made through the warning control should be restricted in such a situation.

In this manner, it is desirable to restrict predetermined warning when the host vehicle is traveling in a section in which the steering wheel 53*a* is rotated significantly. When a path that leads to a parking spot has been registered, it is possible to grasp beforehand a section in which the steering wheel 53*a* is to be rotated significantly, among sections in which the host vehicle travels. The parking assist ECU 10 according to the present embodiment focuses on this respect, and sets a section in which the steering wheel 53*a* is to be rotated significantly as a specific section by executing a specific section setting process when the automatic parking control is started. In addition, the parking assist ECU 10 executes warning restriction control for restricting indication of warning information when the host vehicle is traveling in the set specific section. In the present embodiment, the parking assist ECU 10 executes first warning restriction control and second warning restriction control as the warning restriction control as discussed later.

Figure 15:
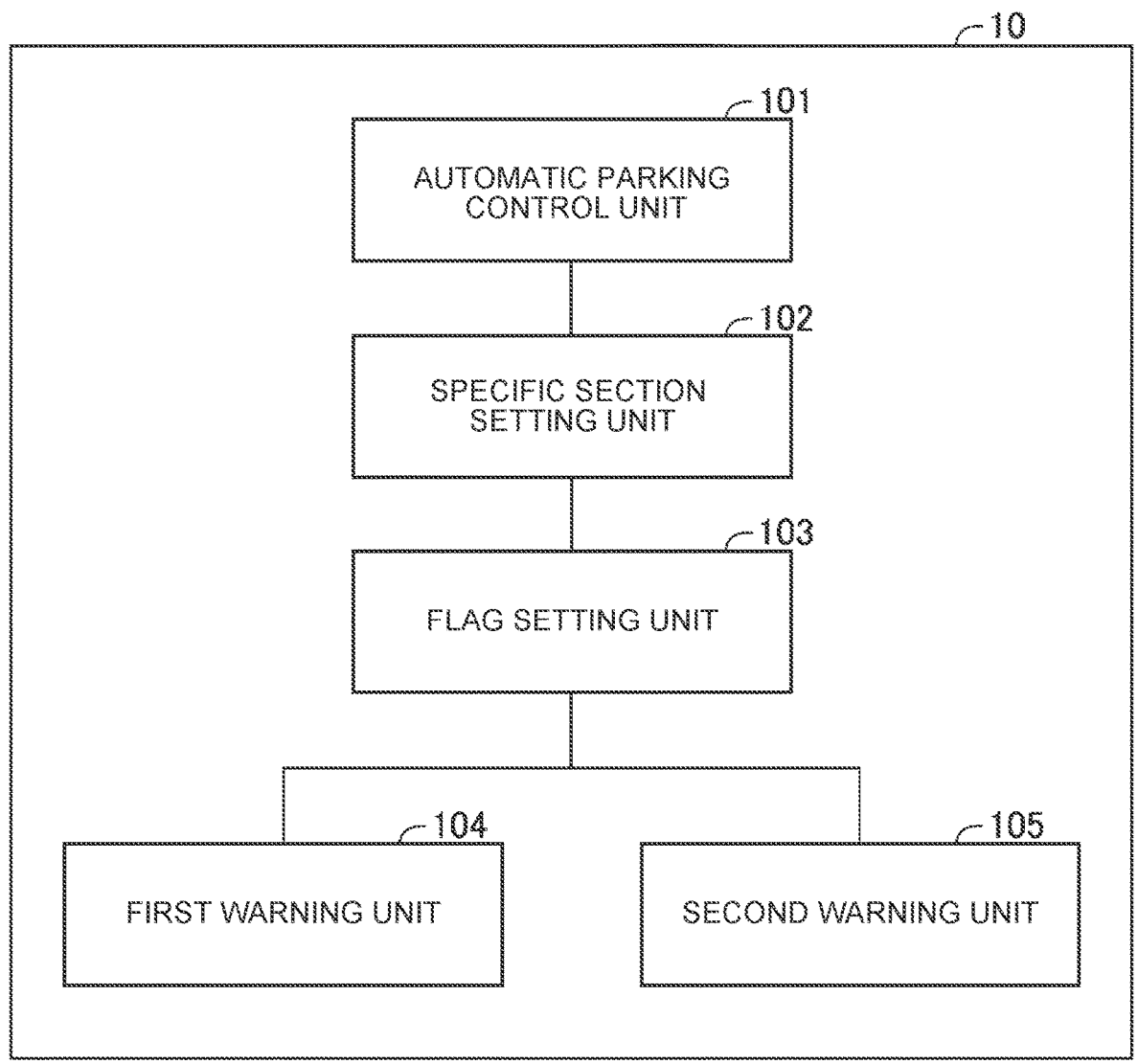
FIG. 15 is a functional block diagram of the parking assist ECU according to the first embodiment.

FIG. 15 is a functional block diagram of the parking assist ECU 10. As illustrated in FIG. 15, the parking assist ECU 10 includes, as its functional blocks, an automatic parking control unit 101, a specific section setting unit 102, a flag setting unit 103, a first warning unit 104, and a second warning unit 105. The automatic parking control unit 101 executes the automatic parking control discussed above.

The specific section setting unit 102 receives input of information as to whether the automatic parking control has been started from the automatic parking control unit 101. In addition, the specific section setting unit 102 sets a specific section when execution of the automatic parking control has been started. In the present embodiment, the specific section is set as a section in which the steering wheel 53*a* of the host vehicle is rotated significantly, of a path on which the host vehicle travels to reach the registered parking spot since the start of execution of the automatic parking control.

When setting a specific section, the specific section setting unit 102 divides the path on which the host vehicle travels to reach the registered parking spot from the position at which execution of the automatic parking control is started into an automatic travel section (section A) in which the automated travel process is executed, a merging section (section B) in which the merging process is executed, a path travel section (section C) in which the path travel process is executed, and a parking process section (section D) in which the parking process is executed as illustrated in FIGS. 6 to 11, for example. The merging section includes a section in which the steering wheel 53*a* is rotated significantly to merge the travel path of the host vehicle with the registered path. In addition, the parking process section includes a section in which the steering wheel 53*a* is rotated significantly when executing operation to vary the posture of the host vehicle in order to park the host vehicle at the registered parking spot. Thus, the specific section setting unit 102 can set the merging section and the parking process section, among the sections resulting from dividing the path, as the specific section.

When setting a specific section, in addition, the specific section setting unit 102 can set a section in which the amount of variation in the steering rotational angle per predetermined unit time is equal to or more than a predetermined threshold variation amount, among the sections in which the host vehicle travels to reach the registered parking spot from the position at which execution of the automatic parking control is started, as the specific section, for example. In this case, the specific section setting unit 102 computes the amount of variation in the steering rotational angle at a position corresponding to each piece of image information on the registered path based on the image information about the pattern and shape of the road surface continuously stored to specify the registered path and information about the steering rotational angle continuously stored in correspondence with the image information. Then, a section of the registered path in which the computed amount of variation in the steering rotational angle is equal to or more than the predetermined threshold variation amount can be extracted and set as the specific section. The threshold variation amount may be an angle variation amount that is equal to or more than 180 [degrees/sec.], for example.

When setting a specific section, further, the specific section setting unit 102 can set a section in which the steering rotational angle is equal to or more than a predetermined threshold angle, among the sections in which the host vehicle travels to reach the registered parking spot from the position at which execution of the automatic parking control is started, as the specific section, for example. In this case, the specific section setting unit 102 can extract a section in which the steering rotational angle is equal to or more than the predetermined threshold angle based on image information about the pattern and shape of the road surface continuously stored to specify the registered path and the steering rotational angle continuously stored in correspondence with the image information, and set the extracted section as the specific section. The threshold angle may be an angle that is equal to or more than 180 [degrees], for example.

When setting a specific section, further, the specific section setting unit 102 can set a curved section with a radius that is equal to or less than a threshold radius, among the sections in which the host vehicle travels to reach the registered parking spot from the position at which execution of the automatic parking control is started, as the specific section, for example. In this case, the specific section setting unit 102 can extract a section of the registered path with a radius that is equal to or more than the threshold radius based on image information about the pattern and shape of the road surface continuously stored to specify the registered path and the steering rotational angle continuously stored in correspondence with the image information, and set the extracted section as the specific section. The threshold radius may be a radius that is equal to or more than 18 [m], for example.

Figure 16:
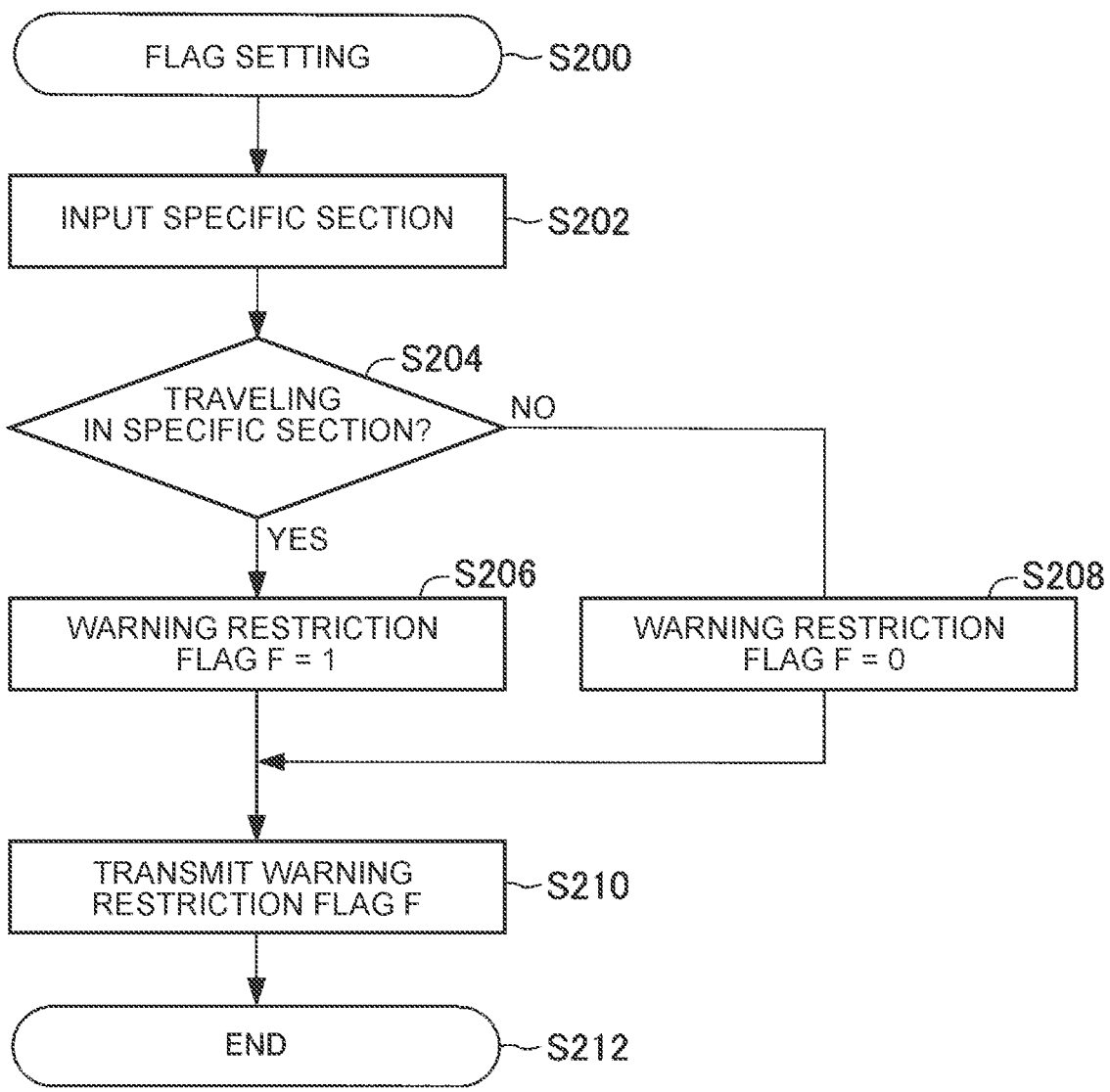
FIG. 16 is a flowchart illustrating an example of a flag setting process routine executed when a flag setting unit sets a warning restriction flag.

The flag setting unit 103 receives input of information about the specific section from the specific section setting unit 102. In addition, the flag setting unit 103 sets a warning restriction flag based on whether the host vehicle is traveling in the specific section. FIG. 16 is a flowchart illustrating an example of a flag setting routine executed when the flag setting unit 103 sets a warning restriction flag. This routine is started when the automatic parking control is started, and repeatedly executed at predetermined short time intervals. When the routine is started, the flag setting unit 103 starts the routine at S200 in FIG. 16, and advances the process to S202. In S202, the flag setting unit 103 receives input of information about the specific section from the specific section setting unit 102. Then, the flag setting unit 103 advances the process to S204, and determines whether the host vehicle is traveling in the specific section. In can be determined whether the host vehicle is traveling in the specific section by various methods. For example, when the specific section is the merging section or the parking process section, it can be determined whether the host vehicle is traveling in the specific section based on whether the automatic parking control unit 101 is executing the merging process or the parking process. Meanwhile, when the specific section is a section in which the amount of variation in the steering rotational angle per unit time or the steering rotational angle is equal to or more than a predetermined threshold, or a curved section with a radius that is equal to or less than a predetermined threshold radius, for example, it can be determined whether the host vehicle is traveling in the specific section by making a comparison between image information about the pattern and shape of the road surface acquired by the camera sensor 212 and image information about the pattern and shape of the road surface stored to specify a section of the registered path set as the specific section.

When it is determined that the host vehicle is traveling in the specific section (S204: Yes), the flag setting unit 103 advances the process to S206, and sets a warning restriction flag F to 1. After that, the flag setting unit 103 advances the process to S210. When it is determined that the host vehicle is not traveling in the specific section (S204: No), on the other hand, the flag setting unit 103 advances the process to S208, and sets the warning restriction flag F to 0. After that, the flag setting unit advances the process to S210.

In S210, the flag setting unit 103 transmits the set warning restriction flag F to the first warning unit 104 and the second warning unit 105. After that, the flag setting unit 103 advances the process to S212, and temporarily ends execution of the routine. By the flag setting unit 103 executing the flag setting process described above, the warning restriction flag F is set to 1 when the host vehicle is traveling in the specific section, and the warning restriction flag F is set to 0 when the host vehicle is traveling in a section other than the specific section.

Figure 17:
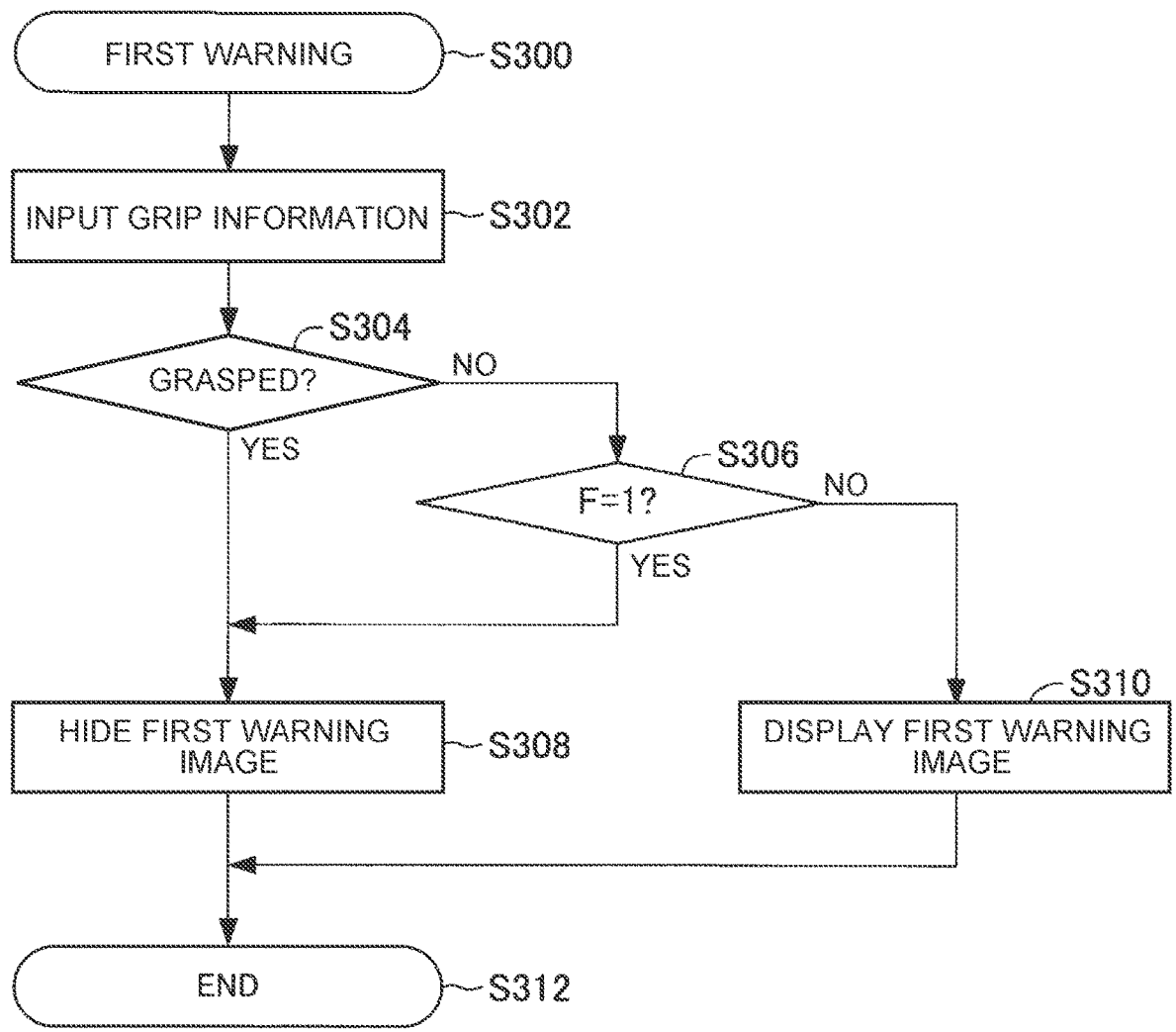
FIG. 17 is a flowchart illustrating an example of a first warning routine.

The first warning unit 104 receives input of the warning restriction flag F from the flag setting unit 103. In addition, the first warning unit 104 executes first warning control and first warning restriction control by executing a first warning routine. FIG. 17 is a flowchart illustrating an example of the first warning routine. This routine is started when execution of the automatic parking control is started, and repeatedly executed at predetermined short time intervals. When the routine is started, the first warning unit 104 starts the routine at S300 in FIG. 17, and advances the process to S302.

In S302, the first warning unit 104 receives input of grip information detected by the grip sensor 24. Then, the first warning unit 104 advances the process to S304, and determines based on the input grip information whether the steering wheel 53*a* is grasped.

When it is determined that the steering wheel 53*a* is grasped (S304: Yes), the first warning unit 104 advances the process to S308. In S308, the first warning unit 104 controls the display device 70 such that the display 72 does not display the first warning image G30 illustrated in FIG. 13. After that, the first warning unit 104 advances the process to S312, and temporarily ends the routine.

When it is determined in S304 that the steering wheel 53*a* is not grasped (S304: No), meanwhile, the first warning unit 104 advances the process to S306. In S306, the first warning unit 104 determines whether the warning restriction flag F is set to 1. When it is determined that the warning restriction flag F is not set to 1 (S306: No), that is, when the host vehicle is traveling in a section other than the specific section, the first warning unit 104 advances the process to S310.

In S310, the first warning unit 104 controls the display device 70 such that the display 72 displays the first warning image G30. When the first warning image G30 is already displayed on the display 72, the display state is maintained. The process in S310 is the first warning control. After that, the first warning unit 104 advances the process to S312, and temporarily ends the routine.

Meanwhile, when it is determined in S306 that the warning restriction flag F is set to 1 (S306: Yes), that is, when the host vehicle is traveling in the specific section, the first warning unit 104 advances the process to S308, and controls the display device 70 such that the display 72 does not display the first warning image G30. The process in S308 executed when the result of the determination made in S306 is Yes is the first warning restriction control. After that, the first warning unit 104 advances the process to S312, and temporarily ends the routine.

By the first warning unit 104 executing the first warning process described above, the first warning control is executed when the driver is not grasping the steering wheel 53*a* during execution of the automatic parking control and while the host vehicle is traveling in a section other than the specific section. Consequently, the first warning image G30 is displayed on the display 72. The driver grasps the steering wheel 53*a* in response to the first warning image G30 being displayed on the display 72. Consequently, an unsafe state of the driver is resolved. When the driver is not grasping the steering wheel 53*a* during execution of the automatic parking control and while the host vehicle is traveling in the specific section, meanwhile, the first warning restriction control is executed, and the first warning image G30 is not displayed on the display 72. That is, warning information is not indicated. This suppresses the driver strongly grasping the steering wheel 53*a* in response to the first warning image G30 being displayed when the steering wheel 53*a* is rotated. Hence, it is possible to effectively suppress suspension or cancellation of the automatic parking control due to the driver strongly grasping the steering wheel 53*a* being rotated.

Figure 18:
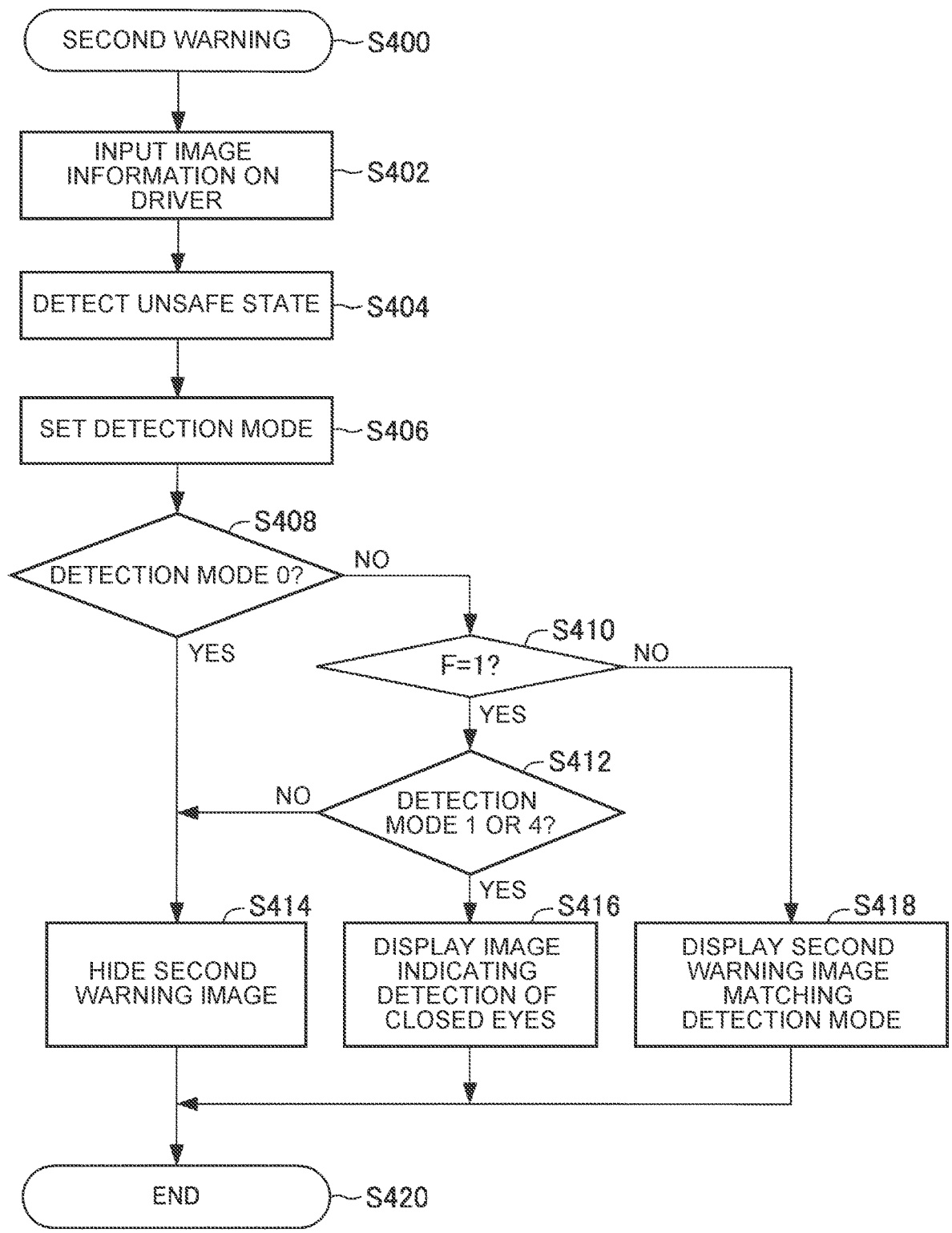
FIG. 18 is a flowchart illustrating an example of a second warning routine.

The second warning unit 105 receives input of the warning restriction flag F from the flag setting unit 103. In addition, the second warning unit 105 executes the second warning control and the second warning restriction control by executing a second warning routine. FIG. 18 is a flowchart illustrating an example of the second warning routine executed by the second warning unit 105. This routine is started when execution of the automatic parking control is started, and repeatedly executed at predetermined short time intervals. When the routine is started, the second warning unit 105 starts the routine at S400 in FIG. 18, and advances the process to S402.

In S402, the second warning unit 105 receives input of image information on the driver from the driver monitor sensor 23. Then, the second warning unit 105 advances the process to S404. In S404, the second warning unit 105 detects an unsafe state of the driver based on the input image information on the driver. In this example, the second warning unit 105 detects the driver keeping his/her eyes closed, looking aside, and being in a poor posture in S404.

Figures 19, 20:
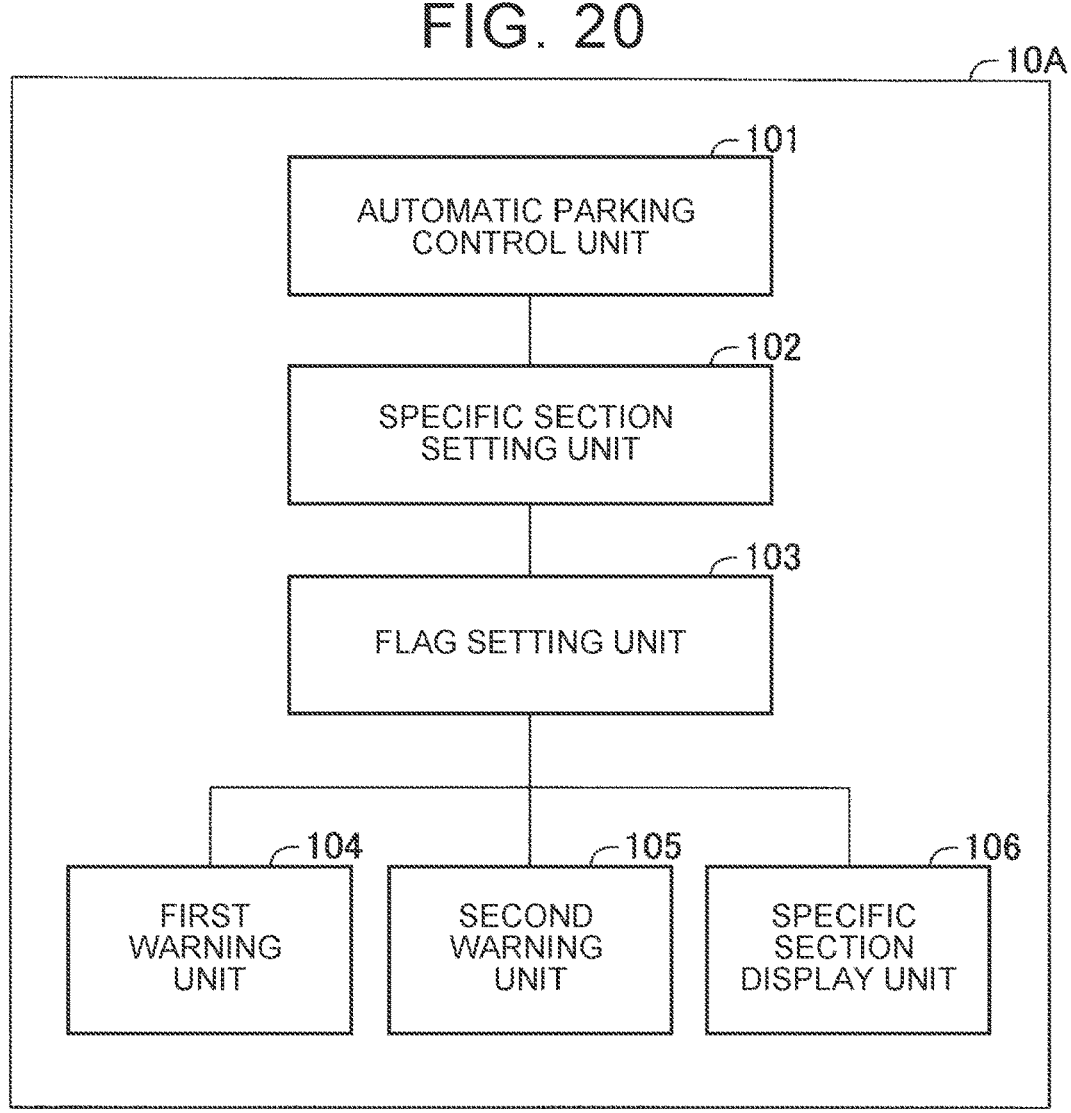
FIG. 19 illustrates detection modes and the contents of the detection modes.
FIG. 20 is a functional block diagram of a parking assist ECU of a parking assist device according to a second embodiment.

Then, the second warning unit 105 advances the process to S406. In S406, the second warning unit 105 sets a detection mode based on the unsafe state of the driver detected in S404. FIG. 19 illustrates detection modes set in S406 and the contents of the detection modes. As indicated in FIG. 19, when the driver is not detected as keeping his/her eyes closed, looking aside, or being in a poor posture, the detection mode is set to mode 0. When the driver is detected as keeping his/her eyes closed only, the detection mode is set to mode 1. When the driver is detected as looking aside only, the detection mode is set to mode 2. When the driver is detected as being in a poor posture only, the detection mode is set to mode 3. When the driver is detected as keeping his/her eyes closed and being in a poor posture, the detection mode is set to mode 4. When the driver is detected as looking aside and being in a poor posture, the detection mode is set to mode 5. The driver is not detected as keeping his/her eyes closed and looking aside at the same time.

After setting the detection mode, the second warning unit 105 advances the process to S408. In S408, the second warning unit 105 determines whether the set detection mode is mode 0. When it is determined that the detection mode is mode 0 (S408: Yes), the second warning unit 105 advances the process to S414. In S414, the second warning unit 105 controls the display device 70 such that the display 72 does not display an image indicating that an unsafe state has been detected, that is, the second warning image. After that, the second warning unit 105 advances the process to S420, and temporarily ends the routine.

When it is determined in S408 that the detection mode is not mode 0 (S408: No), meanwhile, the second warning unit 105 advances the process to S410. In S410, the second warning unit 105 determines whether the warning restriction flag F is set to 1. When it is determined that the warning restriction flag F is not set to 1 (S410: No), that is, when the host vehicle is traveling in a section other than the specific section, the second warning unit 105 advances the process to S418. In S418, the second warning unit 105 controls the display device 70 such that the display 72 displays a detection image that matches the detection mode. For example, the display 72 displays the character image G42 that indicates detection of looking aside when the detection mode is mode 2. The display 72 displays the character image G43 that indicates detection of a poor posture when the detection mode is mode 3. The display 72 displays the character image G42 that indicates detection of looking aside and the character image G43 that indicates detection of a poor posture when the detection mode is mode 5. When the second warning image that should be displayed is already displayed on the display 72 when the process in S418 is executed, the display state is maintained. The process in S418 is the second warning control. After that, the second warning unit 105 advances the process to S420, and temporarily ends the routine.

Meanwhile, when it is determined in S410 that the warning restriction flag F is set to 1 (S410: Yes), that is, when the host vehicle is traveling in the specific section, the second warning unit 105 advances the process to S412. In S412, the second warning unit 105 determines whether the detection mode is set to mode 1 or 4, that is, whether the detection mode is set to a mode that involves detection of closed eyes. When it is determined that the detection mode is set to mode 1 or 4 (S412: Yes), that is, when the detection mode is a mode that involves detection of closed eyes, the second warning unit 105 advances the process to S416. In S416, the second warning unit 105 controls the display device 70 such that the display 72 displays only the character image G41 that indicates detection of closed eyes, among the second warning images. When only the character image G41 is already displayed on the display 72, the display state is maintained. After that, the second warning unit 105 advances the process to S420, and temporarily ends the routine.

On the other hand, when it is determined in S412 that the detection mode is not mode 1 or 4, that is, when the detection mode is a mode that does not involve detection of closed eyes but involves at least detection of looking aside or detection of a poor posture, the second warning unit 105 advances the process to S414, and controls the display device 70 such that the display 72 does not display the second warning image. After that, the second warning unit 105 advances the process to S420, and temporarily ends the routine.

In this manner, when the host vehicle is traveling in the specific section, the display 72 displays the character image G41 that indicates detection of closed eyes only when closed eyes are detected. When an unsafe state other than detection of closed eyes is detected when the host vehicle is traveling in the specific section, the display 72 does not display the second warning image. That is, when the host vehicle is traveling in the specific section, the warning information to be displayed on the display 72 is restricted to only warning information that indicates detection of closed eyes. The processes in S416 and S414 executed when the result of the determination made in S410 is Yes are the second warning restriction control.

The reason that the character image G41 that indicates detection of closed eyes is displayed on the display 72 when closed eyes are detected while the host vehicle is traveling in the specific section (S412: Yes) is that no problem is caused by such display. On the other hand, the reason that a second warning image corresponding to an unsafe state is not displayed on the display 72 when an unsafe state other than closed eyes is detected while the host vehicle is traveling in the specific section is that such display might cause problems such as the driver failing to confirm safety around the vehicle if the driver followed the display or giving discomfort to the driver, for example.

In this manner, the parking assist device 1 according to the present embodiment includes: the parking assist ECU 10 that controls a host vehicle such that the host vehicle is parked at a predetermined parking spot; and the display device 70 that serves as an informing device that indicates predetermined information. The parking assist ECU 10 is configured to be able to execute: automatic parking control in which the host vehicle is controlled such that the host vehicle travels along a path that leads to the parking spot to be parked at the parking spot: warning control (S310, S418) in which the display device 70 is controlled such that the display 72 displays warning information (first warning image G30 or second warning image) when it is found that a driver of the host vehicle is in an unsafe state (S304: No S408: No) during execution of the automatic parking control; and warning restriction control (S308, S414, S416) in which display of warning information on the display 72 is restricted when the host vehicle is traveling in a predetermined specific section (S306: Yes, S410: Yes) during the execution of the automatic parking control.

In addition, the parking assist method according to the present embodiment includes: executing automatic parking control in which the host vehicle is controlled such that the host vehicle travels along a path that leads to a parking spot to be parked at the parking spot: indicating predetermined warning information (S310, S418) when it is found that a driver of the host vehicle is in an unsafe state (S304: No, S408: No), including a state of not grasping a steering wheel of the host vehicle, during execution of the automatic parking control; and regulating indication of the warning information (S308, S414, S416) when the host vehicle is traveling in a predetermined specific section (S306: Yes, S410: Yes) during the execution of the automatic parking control.

The specific section is set as a section including a section in which the steering wheel 53a of the host vehicle is rotated significantly. For example, the specific section is set as a section including a merging section and a parking process section. Alternatively, the specific section is set as a section in which an amount of variation in a steering rotational angle per unit time is equal to or more than a threshold variation amount. Alternatively, the specific section is set as a section in which the steering rotational angle is equal to or more than a threshold angle. Alternatively, the specific section is set as a curved section with a radius that is equal to or less than a threshold radius. By setting the specific section as a section including a section in which the steering wheel 53a is rotated significantly, indication of warning information is restricted while the host vehicle is traveling in a section in which the steering wheel 53a is rotated significantly. Therefore, it is possible to suppress occurrence of problems caused by indicating warning information while the host vehicle is traveling in the specific section, e.g. execution of the automatic parking control being hindered by the driver grasping the steering wheel 53a being rotated, the driver failing to confirm safety around the vehicle as a result of following warning, and giving discomfort to the driver. That is, it is possible to suppress occurrence of problems caused by indicating warning information at an inappropriate timing, by restricting indication of warning information at an inappropriate timing. In other words, with the present embodiment, warning information can be indicated at an appropriate timing.

Second Embodiment

The configuration of a parking assist device according to a second embodiment of the present disclosure is basically the same as the configuration in FIG. 1 described in relation to the first embodiment, and thus will not be specifically described.

FIG. 20 is a functional block diagram of a parking assist ECU of a parking assist device according to the second embodiment. As illustrated in FIG. 20, a parking assist ECU 10A according to the present embodiment includes a specific section display unit 106 in addition to the functional elements (automatic parking control unit 101, specific section setting unit 102, flag setting unit 103, first warning unit 104, and second warning unit 105) provided in the parking assist ECU 10 according to the first embodiment. The functions of the automatic parking control unit 101, the specific section setting unit 102, the flag setting unit 103, the first warning unit 104, and the second warning unit 105 have been described above in relation to the first embodiment, and thus are not described here. Only the specific section display unit 106 will be described.

As illustrated in FIG. 20, the specific section display unit 106 receives input of the warning restriction flag F from the flag setting unit 103. The specific section display unit 106 has a function of causing the display 72 to indicate in an emphasized manner that the vehicle is traveling in the specific section in which the steering wheel is rotated significantly, and a function of informing the driver that the steering wheel will be rotated automatically, when the input warning restriction flag F is set to 1.

Figure 21:
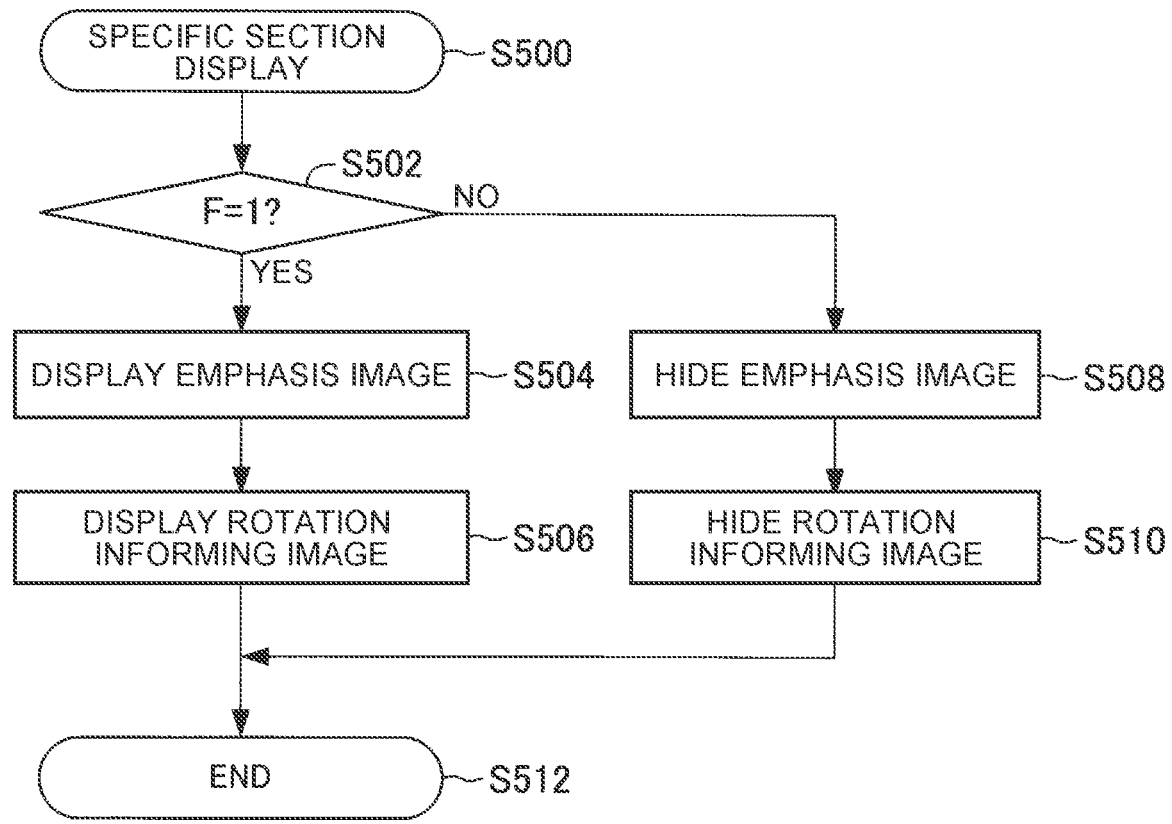
FIG. 21 is a flowchart illustrating an example of a specific section display routine.

FIG. 21 is a flowchart illustrating an example of a specific section display routine executed by the specific section display unit 106 in order to implement the functions described above. This routine is started when execution of the automatic parking control is started, and repeatedly executed at predetermined short time intervals. When the routine is started, the specific section display unit 106 starts the routine at S500, and advances the process to S502. In S502, the specific section display unit 106 determines whether the warning restriction flag F is set to 1, that is, whether the host vehicle is traveling in the specific section.

When it is determined that the warning restriction flag F is set to 1 (S502: Yes), that is, when the host vehicle is traveling in the specific section, the specific section display unit 106 advances the process to S504. In S504, the specific section display unit 106 controls the display device 70 such that the display 72 displays an emphasis image. When the emphasis image is already displayed on the display 72, the display state is maintained. The emphasis image is an image indicating that the host vehicle is traveling in the specific section in which the steering wheel 53a is rotated significantly.

Next, the specific section display unit 106 advances the process to S506. In S506, the specific section display unit 106 controls the display device 70 such that the display 72 displays a rotation informing image. When the rotation informing image is already displayed on the display 72, the display state is maintained. The rotation informing image is an image indicating that the steering wheel 53a will be rotated automatically. After that, the specific section display unit 106 advances the process to S512, and temporarily ends the routine.

Meanwhile, when it is determined in S502 that the warning restriction flag F is not set to 1 (S502: No), that is, when the host vehicle is traveling in a section other than the specific section, the specific section display unit 106 advances the process to S508. In S508, the specific section display unit 106 controls the display device 70 such that the display 72 does not display the emphasis image. Then, the specific section display unit 106 advances the process to S510.

In S510, the specific section display unit 106 controls the display device 70 such that the display 72 does not display the rotation informing image. After that, the specific section display unit 106 advances the process to S512, and temporarily ends the routine.

Figure 22:
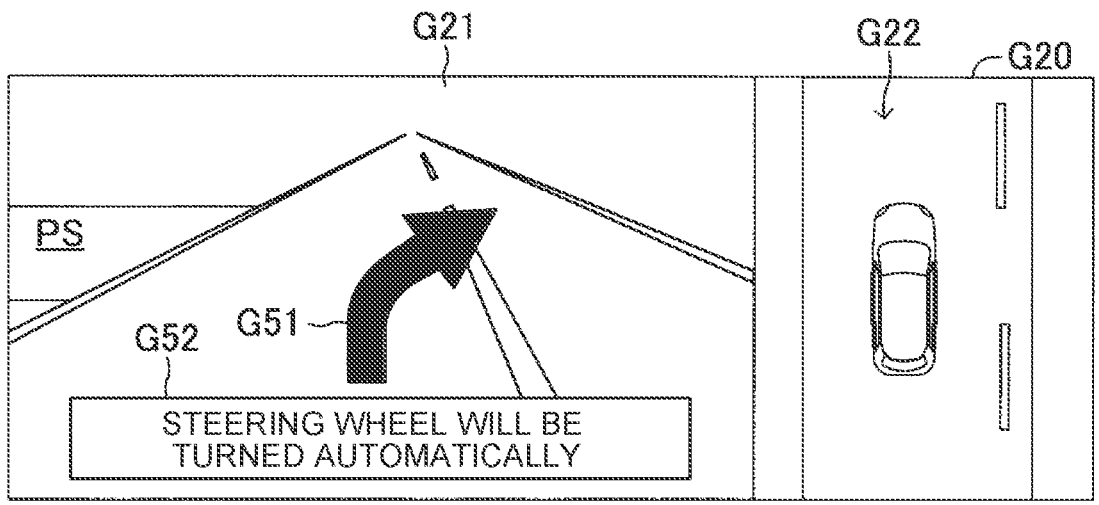
FIG. 22 illustrates a display on which an emphasis image and a rotation informing image are displayed.

By the specific section display unit 106 executing such a specific section display routine, the emphasis image and the rotation informing image are displayed on the display 72 when the host vehicle is traveling in the specific section. FIG. 22 illustrates the display 72 on which the emphasis image and the rotation informing image are displayed. As illustrated in FIG. 22, the display 72 displays a peripheral image G20 that includes a first viewpoint image G21 and a second viewpoint image G22. The first viewpoint image G21 is an image of an area forward of the host vehicle imaged by the front camera device 212a. An emphasis image G51 and a rotation informing image G52 are displayed as superimposed on the first viewpoint image G21. The emphasis image G51 is an image indicating that the steering wheel 53a will be rotated to vary the advancing direction of the host vehicle. In this example, the emphasis image G51 is constituted of an arrow that indicates the direction in which the advancing direction of the host vehicle will be varied. The driver can recognize that the host vehicle is traveling in the specific section in which the steering wheel 53a is rotated significantly by visually recognizing the emphasis image G51 in the display 72.

In addition, the rotation informing image G52 is displayed below the emphasis image G51. As illustrated in FIG. 22, the rotation informing image G52 is a character image indicating that the steering wheel 53a will be rotated automatically. The driver can recognize that the steering wheel 53a will be rotated automatically while the host vehicle is traveling in the specific section by visually recognizing the rotation informing image G52 in the display 72.

In this manner, in the present embodiment, the parking assist ECU 10A controls the display device 70 such that the display 72 displays the rotation informing image G52 indicating that the steering wheel 53a of the host vehicle will be rotated automatically when the host vehicle is traveling in the specific section. Therefore, the driver can expect automatic rotation of the steering wheel 53a.

In the present embodiment, in addition, the parking assist ECU 10A controls the display device 70 such that the display 72 displays the emphasis image G51 indicating that the host vehicle is traveling in the specific section, including a section in which the steering wheel 53a is automatically rotated significantly, when the host vehicle is traveling in the specific section. Therefore, the driver of the host vehicle can recognize that the vehicle is traveling in the specific section.

Third Embodiment

The configuration of a parking assist device according to a third embodiment of the present disclosure is basically the same as the configuration in FIG. 1 described in relation to the first embodiment, and thus will not be specifically described.

Figure 23:
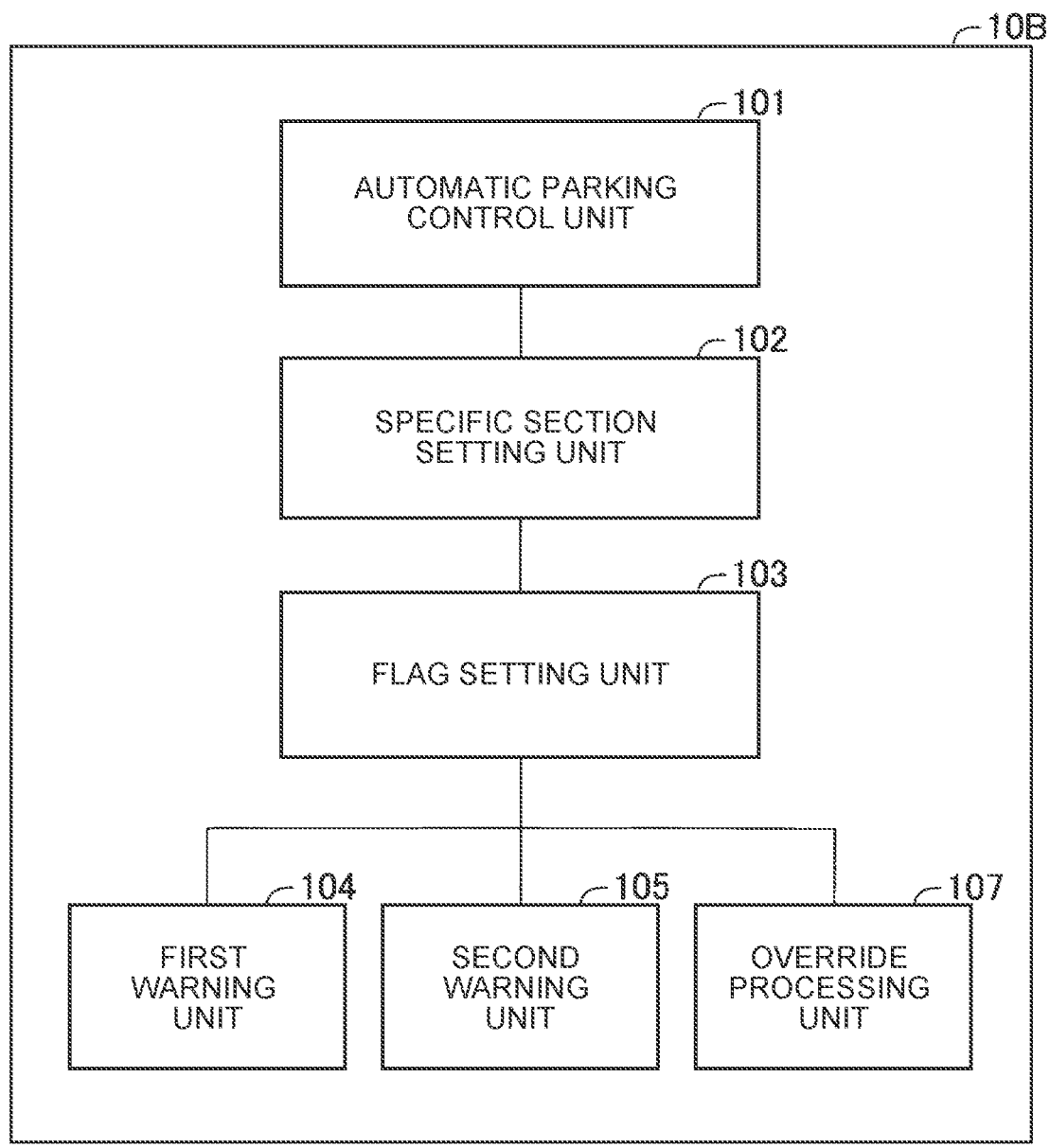
FIG. 23 is a functional block diagram of a parking assist ECU of a parking assist device according to a third embodiment.

FIG. 23 is a functional block diagram of a parking assist ECU of a parking assist device according to the third embodiment. As illustrated in FIG. 23, a parking assist ECU 10B according to the present embodiment includes an override processing unit 107 in addition to the functional elements (automatic parking control unit 101, specific section setting unit 102, flag setting unit 103, first warning unit 104, and second warning unit 105) provided in the parking assist ECU 10 according to the first embodiment. The functions of the automatic parking control unit 101, the specific section setting unit 102, the flag setting unit 103, the first warning unit 104, and the second warning unit 105 have been described above in relation to the first embodiment, and thus are not described here. Only the override processing unit 107 will be described.

The override processing unit 107 receives input of the warning restriction flag F from the flag setting unit 103 as illustrated in FIG. 23. The override processing unit 107 has a function of determining based on the warning restriction flag F whether to continue or suspend or cancel the automatic parking control when the steering wheel 53a is operated during execution of the automatic parking control, and controlling the host vehicle based on the determination result.

Figure 24:
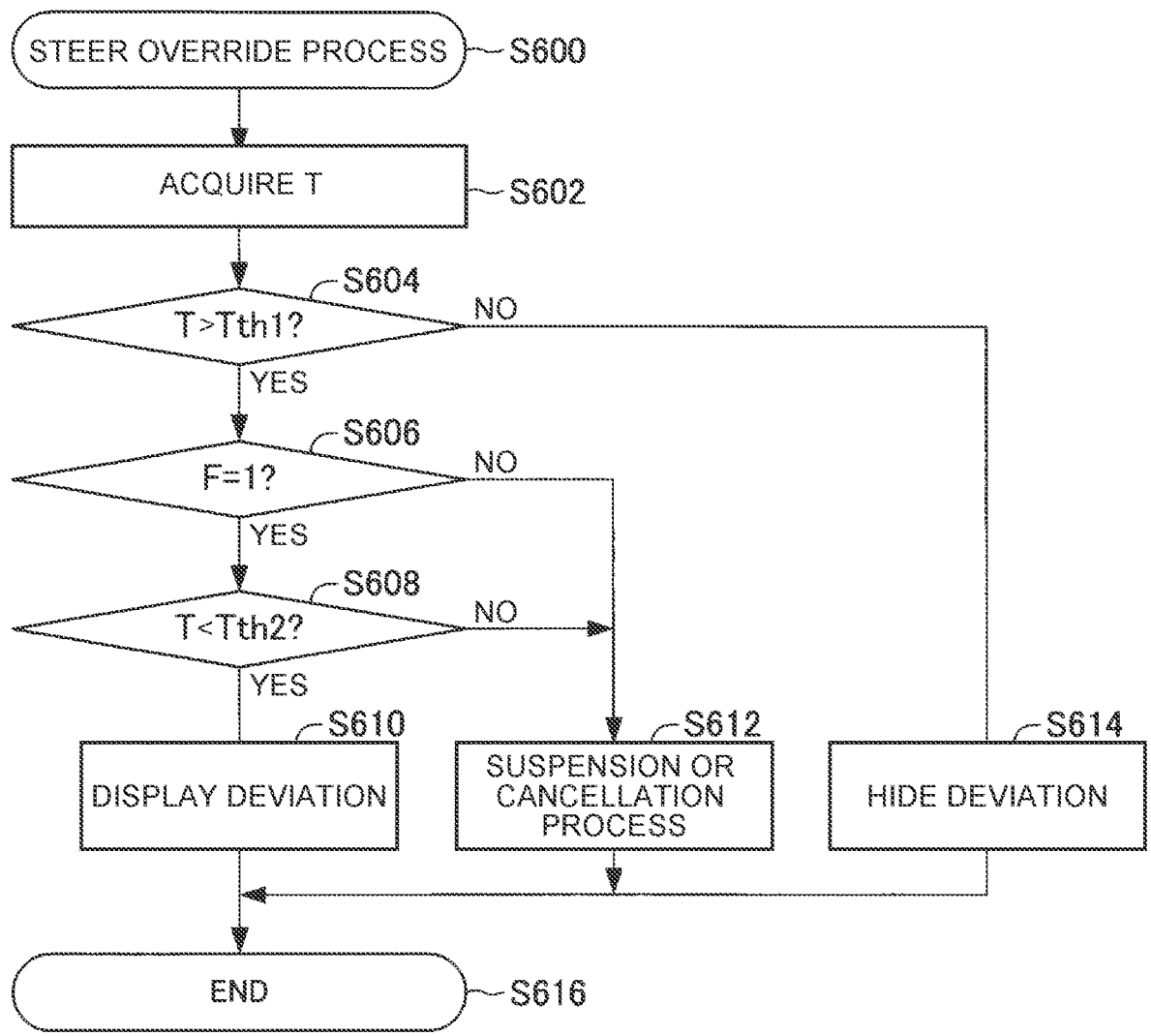
FIG. 24 is a flowchart illustrating an example of a steer override process routine.

FIG. 24 is a flowchart illustrating an example of a steer override process routine executed by the override processing unit 107 in order to implement the function described above. This routine is started when the parking assist ECU 10B has started execution of the automatic parking control, and repeatedly executed at predetermined short time intervals. When the routine is started, the override processing unit 107 starts the routine at S600 in FIG. 24, and advances the process to S602.

In S602, the override processing unit 107 acquires steering torque T from the steering torque sensor 25. Then, the override processing unit 107 advances the process to S604.

In S604, the override processing unit 107 determines whether the acquired steering torque T is more than first threshold torque Tth1. The first threshold torque Tth1 is set in advance to a small value that does not allow the steering wheel 53a to be found as being intentionally operated when the steering torque T is equal to or less than the first threshold torque Tth1 but that allows the steering wheel 53a to be determined as being intentionally operated when the steering torque T is more than the first threshold torque Tth1. The first threshold torque Tth1 can be set to 0.4 [Nm], for example.

When it is determined in S604 that the steering torque T is not more than the first threshold torque Tth1 (S604: No), the override processing unit 107 advances the process to S614. In S614, the override processing unit 107 controls the display device 70 such that the display 72 does not display a deviation image to be discussed later. After that, the override processing unit 107 temporarily ends the routine.

When it is determined in S604 that the steering torque T is more than the first threshold torque Tth1 (S604: Yes), the override processing unit 107 determines that the steering wheel 53a has been operated. In this case, the override processing unit 107 advances the process to S606.

In S606, the override processing unit 107 determines whether the warning restriction flag F is set to 1. When it is determined that the warning restriction flag F is not set to 1, that is, when the host vehicle is traveling in a section other than the specific section, the override processing unit 107 determines that the driver has intentionally operated the steering wheel 53a. In this case, the override processing unit 107 advances the process to S612, and executes a process of suspending or canceling the automatic parking control. Consequently, the host vehicle is stopped, and the automatic parking control is suspended or cancelled. After that, the override processing unit 107 advances the process to S616, and ends the routine. When the automatic parking control is suspended or cancelled through the process in S612, the process is not repeatedly executed. When the automatic parking control is suspended or cancelled through the process in S612, the subsequent operation of driving the host vehicle is performed by the driver. When the automatic parking control is suspended through the process in S612, the automatic parking control may be resumed by an operation by the driver.

When it is determined in S606 that the warning restriction flag F is set to 1, that is, when the host vehicle is traveling in the specific section, the override processing unit 107 advances the process to S608. In S608, the override processing unit 107 determines whether the steering torque T is less than second threshold torque Tth2. The second threshold torque Tth2 is set to a value that is more than the first threshold torque Tth1 and that does not allow the travel path of the host vehicle to be recovered to the registered path when the steering torque T is equal to or more than the second threshold torque Tth2. The second threshold torque Tth2 can be set to 2.6 [Nm], for example.

When it is determined in S608 that the steering torque is not less than the second threshold torque Tth2 (S608: No), the override processing unit 107 advances the process to S612, and executes a process of suspending or canceling the automatic parking control. Consequently, the host vehicle is stopped, and the automatic parking control is suspended or cancelled. After that, the override processing unit 107 advances the process to S616, and ends the routine. When it is determined in S608 that the steering torque is less than the second threshold torque Tth2 (S608: Yes), on the other hand, the override processing unit 107 advances the process to S610. In S610, the override processing unit 107 controls the display device 70 such that the display 72 displays a deviation image indicating that the travel path of the host vehicle will deviate from the registered path as the steering torque is input to the steering wheel 53a.

Figure 25:
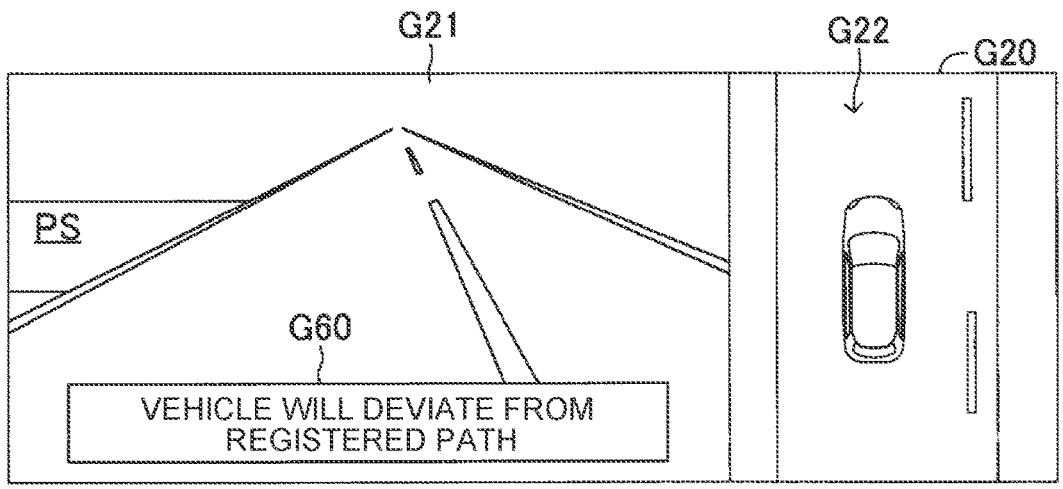
FIG. 25 illustrates a display on which a deviation image is displayed.

FIG. 25 illustrates the display 72 on which a deviation image is displayed. As illustrated in FIG. 25, the display 72 displays a peripheral image G20 that includes a first viewpoint image G21 and a second viewpoint image G22. The first viewpoint image G21 is an image of an area forward of the host vehicle imaged by the front camera device 212a. A deviation image G60 is displayed as superimposed on the first viewpoint image G21. In this example, the deviation image G60 is a character image indicating that the travel path of the host vehicle will deviate from the registered path.

In S610, the override processing unit 107 controls the display device 70 such that the display 72 displays a deviation image such as that illustrated in FIG. 25, and thereafter advances the process to S616 and temporarily ends the routine. In this case, the automatic parking control is continued.

By the override processing unit 107 executing the override process routine described above, the parking assist ECU 10B determines that a conscious steering intervention has been performed by the driver when steering torque T that is more than the first threshold torque Tth1 is detected during execution of the automatic parking control and when the host vehicle is traveling in a section other than the specific section. In this case, the automatic parking control is suspended or canceled. On the other hand, the parking assist ECU 10B determines that an unconscious steering intervention has been performed by the driver when steering torque that is more than the first threshold torque Tth1 and less than the second threshold torque Tth2 is detected during execution of the automatic parking control and when the host vehicle is traveling in the specific section. In this case, the automatic parking control is continued. In this manner, it is possible to discriminate between a conscious steering intervention and an unconscious steering intervention by the driver, suspend the automatic parking control by respecting the intention of the driver if a conscious steering intervention has been performed, and continue the automatic parking control if an unconscious steering intervention has been performed.

When steering torque that is more than the first threshold torque Tth1 and less than the second threshold torque Tth2 is detected during execution of the automatic parking control and when the host vehicle is traveling in the specific section, in addition, the automatic parking control is continued, but the host vehicle deviates from the registered path as the host vehicle is steered by the steering torque input to the steering wheel 53a. In this case, the deviation image G60 is displayed on the display 72. The travel path of the host vehicle that has deviated from the registered path can be recovered to the registered path by the driver visually recognizing the deviation image G60 and reducing the steering torque input to the steering wheel 53a.

When steering torque that is equal to or more than the second threshold torque Tth2 is detected during execution of the automatic parking control and when the host vehicle is traveling in the specific section, the parking assist ECU 10B determines that the host vehicle cannot be recovered to the registered path. In this case, the automatic parking control is suspended or canceled. Consequently, the automatic parking control can be ended quickly when the host vehicle cannot be recovered to the registered path.

While embodiments of the present disclosure have been described above, the parking assist device according to the present disclosure should not be limited to the above embodiments. For example, the functional components of the parking assist ECU of the parking assist device according to the present disclosure may include both the specific section display unit 106 described in relation to the second embodiment and the override processing unit 107 described in relation to the third embodiment.

While the automatic parking control includes the stopping process in the first embodiment, the stopping process may be omitted. In this case, the process transitions from the path travel process to the parking process without stopping the host vehicle. That is, the process can be caused to transition from the path travel process to the parking process seamlessly without stopping the host vehicle.

While the merging section, the parking process section, etc. are indicated as examples of the specific section in which the steering wheel is rotated significantly in the first embodiment, a section included in the automated travel section and the path travel section in which the steering wheel is rotated significantly can also be set as the specific section. When the automated travel section or the path travel section includes a section in which a right or left turn is made, such a section can also be set as the specific section.

While image information about the pattern and shape of the road surface is indicated as an example of the information for specifying the registered path in the first embodiment, the information for specifying the registered path may be information about the shape of the registered path illustrated on a map etc., for example. In this case, a section in which the steering wheel is turned significantly can be computed from the shape of the registered path.

While the parking assist ECU stores the registered path in the above embodiments, the technology according to the present disclosure can also be applied to a case where the registered path is not stored. For example, the parking assist ECU may be configured to generate a path that leads to a parking spot and control the host vehicle such that the host vehicle travels along the generated path to be parked at the parking spot. In this case, a predetermined section of the generated path, e.g. a section including a section in which the steering wheel is expected to be rotated significantly, can be set as the specific section. Indication of warning information can be restricted when the host vehicle is traveling in the set specific section.

While predetermined information is displayed on the display 72 of the display device 70 by means of the first warning image, the second warning image, the emphasis image, the rotation informing image, the deviation image, etc. in the above embodiments, the predetermined information described above can be indicated by a device other than the display device. For example, the predetermined information described above can be indicated through voice guidance in place of or in addition to the display device.

While the automatic parking control includes the automated travel process, the merging process, the path travel process, and the parking process in the above embodiments, it is only necessary that the automatic parking control should include a process in which the host vehicle is parked at a parking spot, that is, the parking process. For example, the automatic parking control may be constituted of only the parking process. In this case, the parking assist ECU can compute a path for parking the host vehicle at a predetermined position in a parking spot, and set a predetermined section of the computed path, e.g. a section including a section in which the steering wheel is expected to be rotated significantly or a section including a section in which the posture of the host vehicle is varied in order to park the host vehicle at the parking spot, as the specific section, for example. Indication of warning information can be restricted when the host vehicle is traveling in the set specific section. In this manner, the technology according to the present disclosure can be modified without departing from the scope and spirit of the present disclosure.

The technology according to the present disclosure is applicable to technologies that conform to the standards ISO 20900 (partially automated parking systems: PAPS) and ISO 16787 (assisted parking systems: APS).

What is claimed is:

1. A parking assist device comprising:
a control device configured to control a host vehicle such that the host vehicle is parked at a predetermined parking spot; and
an informing device configured to indicate predetermined information, wherein
the control device is configured to execute automatic parking control in which the host vehicle is controlled such that the host vehicle travels along a path to be parked at the parking spot, the path leading to the parking spot,
the control device is configured to execute warning control in which the informing device is controlled such that the informing device indicates predetermined warning information when the control device detects that a driver of the host vehicle is in an unsafe state during execution of the automatic parking control, the unsafe state including a state in which the driver does not grasp a steering wheel of the host vehicle, and
the control device is configured to execute warning restriction control in which indication of the warning information by the informing device is restricted when the host vehicle is traveling in a predetermined specific section during the execution of the automatic parking control, and the control device detects that the driver of the host vehicle is in the unsafe state.

2. The parking assist device according to claim 1, wherein the path includes a registered path stored in advance.

3. The parking assist device according to claim 1, wherein the specific section is set as a section including a section in which the steering wheel of the host vehicle is rotated significantly.

4. The parking assist device according to claim 1, wherein the specific section is set as a section in which an amount of variation in a rotational angle of the steering wheel of the host vehicle per predetermined unit time is equal to or more than a threshold variation amount.

5. The parking assist device according to claim 1, wherein the specific section is set as a section in which a rotational angle of the steering wheel of the host vehicle is equal to or more than a threshold angle.

6. The parking assist device according to claim 1, wherein the specific section is set as a curved section with a radius that is equal to or less than a threshold radius.

7. The parking assist device according to claim 3, wherein the control device is configured to control the informing device so as to indicate information showing that the steering wheel of the host vehicle is automatically rotated when the host vehicle is traveling in the specific section.

8. The parking assist device according to claim 1, wherein:
the control device stores one of paths to the parking spot as a registered path in advance;
the automatic parking control includes
an automated travel process in which the host vehicle is controlled such that the host vehicle travels in a vicinity of the registered path in parallel with the registered path,
a merging process in which the host vehicle is controlled such that a travel path of the host vehicle is merged with the registered path, and
a path travel process in which the host vehicle is caused to travel along the registered path after execution of the merging process; and
the specific section includes a merging section in which the host vehicle travels during the execution of the merging process.

9. The parking assist device according to claim 1, wherein:
the control device stores one of paths to the parking spot as a registered path in advance;
the control device is configured to execute an automated travel process, a merging process, and a path travel process as the automatic parking control, the automated travel process being a process in which the host vehicle is controlled such that the host vehicle travels in a vicinity of the registered path in parallel with the registered path, the merging process being a process in which the host vehicle is controlled such that a travel path of the host vehicle is merged with the registered path, and the path travel process being a process in which the host vehicle is caused to travel along the registered path after execution of the merging process; and
the specific section includes a merging section in which the host vehicle travels during the execution of the merging process.

10. The parking assist device according to claim 8, wherein the specific section includes a section in which operation to vary a posture of the host vehicle in order to park the host vehicle at the parking spot is executed.

11. The parking assist device according to claim 1, wherein:
the informing device is a display device that displays a predetermined image; and
the control device is configured to control the display device so as to display an image in which the specific section is emphasized while the host vehicle is traveling in the specific section.

12. A parking assist device comprising:
a control device configured to control a host vehicle such that the host vehicle is parked at a predetermined parking spot; and
an informing device configured to indicate predetermined information, wherein
the control device is configured to execute automatic parking control in which the host vehicle is controlled such that the host vehicle travels along a path to be parked at the parking spot, the path leading to the parking spot,
the control device is configured to execute warning control in which the informing device is controlled such that the informing device indicates predetermined warning information when the control device detects that a driver of the host vehicle is in an unsafe state during execution of the automatic parking control, the unsafe state including a state in which the driver does not grasp a steering wheel of the host vehicle, and the control device is configured to execute warning restriction control in which indication of the warning information by the informing device is restricted when the host vehicle is traveling in a predetermined specific section during the execution of the automatic parking control, wherein the specific section is set as a section including a section in which the steering wheel of the host vehicle is rotated significantly, further comprising a steering torque sensor configured to detect steering torque that acts on the steering wheel of the host vehicle, wherein:

the control device is configured to suspend or cancel the automatic parking control when (i) the host vehicle is traveling in a section other than the specific section during the execution of the automatic parking control and (ii) the steering torque sensor detects steering torque that is more than predetermined first threshold torque; and the control device is configured to continue the automatic parking control when (i) the host vehicle is traveling in the specific section during the execution of the automatic parking control and (ii) the steering torque sensor detects steering torque that is more than the first threshold torque.

13. The parking assist device according to claim 12, wherein the control device is configured to control the informing device so as to indicate information showing that a travel path of the host vehicle deviates when (i) the host vehicle is traveling in the specific section during the execution of the automatic parking control and (ii) the steering torque sensor detects steering torque that is more than the first threshold torque.

14. The parking assist device according to claim 13, wherein the control device is configured to suspend or cancel the automatic parking control when (i) the host vehicle is traveling in the specific section during the execution of the automatic parking control and (ii) the steering torque sensor detects steering torque that is equal to or more than second threshold torque, the second threshold torque being set in advance as steering torque with a magnitude that causes the travel path of the host vehicle to deviate to a degree that does not allow recovery to the path that leads to the parking spot.

15. A parking assist method of controlling a host vehicle such that the host vehicle is parked at a predetermined parking spot, the parking assist method comprising:

executing automatic parking control in which the host vehicle is controlled such that the host vehicle travels along a path to be parked at the parking spot, the path leading to the parking spot;

indicating predetermined warning information when a driver of the host vehicle is found to be in an unsafe state during execution of the automatic parking control, the unsafe state including a state in which the driver does not grasp a steering wheel of the host vehicle; and restricting indication of the warning information when the host vehicle is traveling in a predetermined specific section during the execution of the automatic parking control, and a control device detects that the driver of the host vehicle is in the unsafe state.

* * * * *